US 10,785,325 B1

(12) United States Patent
Baishya et al.

(10) Patent No.: US 10,785,325 B1
(45) Date of Patent: Sep. 22, 2020

(54) AUDIENCE BINNING SYSTEM AND METHOD FOR WEBCASTING AND ON-LINE PRESENTATIONS

(71) Applicant: ON24, Inc., San Francisco, CA (US)

(72) Inventors: Dhruba Baishya, Emeryville, CA (US); Jayesh Sahasi, Los Altos, CA (US)

(73) Assignee: ON24, Inc., San Francisco, CA (US)

( * ) Notice: Subject to any disclaimer, the term of this patent is extended or adjusted under 35 U.S.C. 154(b) by 628 days.

(21) Appl. No.: 14/476,274

(22) Filed: Sep. 3, 2014

(51) Int. Cl.
*H04L 29/08* (2006.01)
*H04L 12/18* (2006.01)

(52) U.S. Cl.
CPC .......... *H04L 67/22* (2013.01); *H04L 12/1822* (2013.01)

(58) Field of Classification Search
CPC ... G06Q 10/10; H04L 29/06; H04L 29/08072; H04L 29/06027; H04L 12/581; H04L 67/22; H04L 12/1822; H04L 29/08; H04L 12/18
USPC .......... 709/204; 370/260; 707/770; 715/759
See application file for complete search history.

(56) References Cited

U.S. PATENT DOCUMENTS

| | | |
|---|---|---|
| 5,220,665 A | 6/1993 | Coyle, Jr. |
| 5,388,197 A | 2/1995 | Rayner |
| 5,420,801 A | 5/1995 | Dockter et al. |
| 5,557,796 A | 9/1996 | Fehskens et al. |
| 5,642,171 A | 6/1997 | Baumgartner et al. |
| 5,680,619 A | 10/1997 | Gudmundson et al. |
| 5,732,216 A | 3/1998 | Logan et al. |
| 5,748,185 A | 5/1998 | Stephan et al. |
| 5,752,244 A | 5/1998 | Rose et al. |
| 5,801,685 A | 9/1998 | Miller et al. |
| 5,815,154 A | 9/1998 | Hirschtick et al. |
| 5,838,973 A | 11/1998 | Carpenter-Smith et al. |
| 5,861,906 A | 1/1999 | Dunn |
| 5,892,915 A | 4/1999 | Duso et al. |
| 5,929,850 A | 7/1999 | Broadwin |
| 5,996,015 A | 11/1999 | Day |
| 6,006,332 A | 12/1999 | Rabne et al. |

(Continued)

FOREIGN PATENT DOCUMENTS

| | | |
|---|---|---|
| CN | 1500353 A | 5/2004 |
| CN | 103535026 A | 1/2014 |

(Continued)

OTHER PUBLICATIONS

Best practices in Webcasting for Publishing (hereinafter "NPL document"); Author: ON24, Publication: 2006.*

(Continued)

*Primary Examiner* — Tonia L Dollinger
*Assistant Examiner* — Mehulkumar J Shah

(57) ABSTRACT

A virtual audience binning system and method are described. The system and method dynamically labels a group with information derived from its current participants and possibly their conversations through data mining. Then, new audience would use this contextual information to decide their relevance and interest with the groups. Furthermore, using the system, the quality of virtual binning increases with number of participants that solves the problem of size so that it is a solution that's built to work at scale. The virtual audience binning may be used with an online presentation system that generates and displays webcasts and virtual events to the audience members.

22 Claims, 17 Drawing Sheets

(56) References Cited

U.S. PATENT DOCUMENTS

| | | | |
|---|---|---|---|
| 6,008,807 A | 12/1999 | Bretschneider et al. | |
| 6,009,458 A | 12/1999 | Hawkins et al. | |
| 6,014,706 A | 1/2000 | Cannon | |
| 6,058,424 A | 5/2000 | Dixon | |
| 6,097,441 A | 8/2000 | Allport | |
| 6,108,645 A | 8/2000 | Eichstaedt et al. | |
| 6,141,595 A | 10/2000 | Gloudeman et al. | |
| 6,155,840 A | 12/2000 | Sallette | |
| 6,157,809 A | 12/2000 | Kagmbayashi | |
| 6,223,292 B1 | 4/2001 | Dean et al. | |
| 6,253,368 B1 | 6/2001 | Nelin et al. | |
| 6,324,683 B1 | 11/2001 | Fuh et al. | |
| 6,366,916 B1 | 4/2002 | Baer et al. | |
| 6,396,500 B1 | 5/2002 | Qureshi et al. | |
| 6,404,978 B1 | 6/2002 | Abe | |
| 6,445,834 B1 | 9/2002 | Rising, III et al. | |
| 6,452,609 B1 | 9/2002 | Katinsky et al. | |
| 6,473,749 B1 | 10/2002 | Smith et al. | |
| 6,523,022 B1 | 2/2003 | Hobbs | |
| 6,535,909 B1 | 3/2003 | Rust | |
| 6,538,665 B2 | 3/2003 | Crow et al. | |
| 6,546,405 B2 | 4/2003 | Gupta et al. | |
| 6,601,026 B2 | 7/2003 | Appelt et al. | |
| 6,628,279 B1 | 9/2003 | Schell et al. | |
| 6,629,065 B1 | 9/2003 | Gadh et al. | |
| 6,636,237 B1 | 10/2003 | Murray et al. | |
| 6,636,888 B1 | 10/2003 | Bookspan et al. | |
| 6,657,543 B1 | 12/2003 | Chung | |
| 6,697,805 B1 | 2/2004 | Choquier et al. | |
| 6,714,909 B1 | 3/2004 | Gibbon et al. | |
| 6,715,126 B1 | 3/2004 | Chang et al. | |
| 6,728,753 B1 | 4/2004 | Parasnis et al. | |
| 6,745,344 B1 | 6/2004 | Joshi et al. | |
| 6,748,382 B1 | 6/2004 | Mohan et al. | |
| 6,795,972 B2 | 9/2004 | Rovira | |
| 6,801,224 B1 | 10/2004 | Lewallen | |
| 6,834,308 B1 | 12/2004 | Ikezoye et al. | |
| 6,842,175 B1 | 1/2005 | Schmalstieg et al. | |
| 6,850,944 B1 | 2/2005 | MacCall et al. | |
| 6,859,838 B1 | 2/2005 | Puranik et al. | |
| 6,920,181 B1 | 7/2005 | Porter | |
| 7,062,722 B1 | 6/2006 | Carlin et al. | |
| 7,079,990 B2 | 7/2006 | Haller et al. | |
| 7,096,416 B1 | 8/2006 | Smith et al. | |
| 7,103,770 B2 | 9/2006 | Conrath | |
| 7,146,329 B2 | 12/2006 | Conkwright et al. | |
| 7,168,035 B1 * | 1/2007 | Bell | G06F 40/14 715/234 |
| 7,188,186 B1 | 3/2007 | Meyer et al. | |
| 7,281,034 B1 | 10/2007 | Eyal | |
| 7,281,060 B2 | 10/2007 | Hofmann et al. | |
| 7,290,057 B2 | 10/2007 | Suanders et al. | |
| 7,296,137 B2 | 11/2007 | Moyer | |
| 7,313,595 B2 | 12/2007 | Rust | |
| 7,330,875 B1 | 2/2008 | Parasnis et al. | |
| 7,349,944 B2 | 3/2008 | Vernon | |
| 7,350,231 B2 | 3/2008 | Madison et al. | |
| 7,363,372 B2 | 4/2008 | Potenzone et al. | |
| 7,370,269 B1 | 5/2008 | Prabhu et al. | |
| 7,415,529 B2 | 8/2008 | Saunders et al. | |
| 7,418,431 B1 | 8/2008 | Nies et al. | |
| 7,441,201 B1 | 10/2008 | Printezis | |
| 7,454,708 B2 | 11/2008 | O'Neal et al. | |
| 7,559,055 B2 | 7/2009 | Yang et al. | |
| 7,561,178 B2 | 7/2009 | Baartman et al. | |
| 7,590,945 B2 | 9/2009 | Sims et al. | |
| 7,711,722 B1 | 5/2010 | Sahasi et al. | |
| 7,712,052 B2 | 5/2010 | Szeliski et al. | |
| 7,873,638 B2 | 1/2011 | Young et al. | |
| 8,234,336 B2 | 7/2012 | Slater et al. | |
| 8,392,821 B2 | 3/2013 | DeMarco et al. | |
| 8,682,672 B1 | 3/2014 | Ha et al. | |
| 8,682,969 B1 | 3/2014 | Sahasi et al. | |
| 8,706,812 B2 | 4/2014 | Sahasi et al. | |
| 8,798,252 B2 | 8/2014 | Krantz et al. | |
| 9,046,995 B2 | 6/2015 | Garland | |
| 9,135,312 B2 | 9/2015 | Greenspan et al. | |
| 9,148,480 B2 | 9/2015 | Sahasi et al. | |
| 9,224,173 B2 * | 12/2015 | Arora | H04L 67/306 |
| 9,553,922 B1 | 1/2017 | Guarraci et al. | |
| 9,892,028 B1 | 2/2018 | Garland | |
| 9,973,576 B2 | 5/2018 | Sahasi et al. | |
| 10,430,491 B1 | 10/2019 | Joshi et al. | |
| 2001/0027420 A1 | 10/2001 | Boublik et al. | |
| 2001/0032242 A1 | 10/2001 | Terahama et al. | |
| 2001/0032305 A1 | 10/2001 | Barry | |
| 2002/0016788 A1 | 2/2002 | Burridge | |
| 2002/0026323 A1 | 2/2002 | Sakaguchi et al. | |
| 2002/0065635 A1 | 5/2002 | Lei et al. | |
| 2002/0078150 A1 | 6/2002 | Thompson et al. | |
| 2002/0085029 A1 | 7/2002 | Ghani | |
| 2002/0087496 A1 * | 7/2002 | Stirpe | G06Q 30/02 706/45 |
| 2002/0107673 A1 | 8/2002 | Haller et al. | |
| 2002/0112031 A1 | 8/2002 | Franklin et al. | |
| 2002/0112155 A1 | 8/2002 | Martherus et al. | |
| 2002/0112247 A1 | 8/2002 | Horner et al. | |
| 2002/0122050 A1 | 9/2002 | Sandberg | |
| 2002/0133719 A1 | 9/2002 | Westerdal | |
| 2002/0143901 A1 | 10/2002 | Lupo et al. | |
| 2002/0152278 A1 | 10/2002 | Pontenzone et al. | |
| 2002/0193895 A1 | 12/2002 | Qian et al. | |
| 2003/0004791 A1 | 1/2003 | Kojima | |
| 2003/0005019 A1 | 1/2003 | Pabla et al. | |
| 2003/0005465 A1 | 1/2003 | Connely | |
| 2003/0014521 A1 | 1/2003 | Elson et al. | |
| 2003/0025650 A1 | 2/2003 | Uesaki et al. | |
| 2003/0037131 A1 | 2/2003 | Verma | |
| 2003/0061280 A1 | 3/2003 | Bulson et al. | |
| 2003/0061330 A1 | 3/2003 | Frisco et al. | |
| 2003/0071810 A1 | 4/2003 | Shoov et al. | |
| 2003/0086682 A1 | 5/2003 | Schofield et al. | |
| 2003/0101091 A1 | 5/2003 | Levin et al. | |
| 2003/0115267 A1 | 6/2003 | Hinton et al. | |
| 2003/0154277 A1 | 8/2003 | Haddad et al. | |
| 2003/0156135 A1 | 8/2003 | Lucarelli | |
| 2003/0167315 A1 | 9/2003 | Chowdhry | |
| 2003/0204566 A1 | 10/2003 | Dhupelia et al. | |
| 2004/0024898 A1 | 2/2004 | Wan | |
| 2004/0030787 A1 | 2/2004 | Jandel et al. | |
| 2004/0032424 A1 | 2/2004 | Florschuetz | |
| 2004/0039834 A1 | 2/2004 | Saunders et al. | |
| 2004/0054542 A1 | 3/2004 | Foote et al. | |
| 2004/0059941 A1 | 3/2004 | Hardman et al. | |
| 2004/0073629 A1 | 4/2004 | Bazot et al. | |
| 2004/0098754 A1 | 5/2004 | Vella et al. | |
| 2004/0103150 A1 | 5/2004 | Ogdon et al. | |
| 2004/0125877 A1 | 7/2004 | Chang et al. | |
| 2004/0143603 A1 | 7/2004 | Kaufmann et al. | |
| 2004/0148375 A1 | 7/2004 | Levett et al. | |
| 2004/0153504 A1 | 8/2004 | Hutchinson et al. | |
| 2004/0162787 A1 | 8/2004 | Madison et al. | |
| 2004/0167896 A1 | 8/2004 | Eakin | |
| 2004/0187140 A1 | 9/2004 | Aigner et al. | |
| 2004/0237120 A1 | 11/2004 | Lewin et al. | |
| 2004/0243928 A1 | 12/2004 | Hesmer | |
| 2004/0268224 A1 | 12/2004 | Balkus et al. | |
| 2005/0039131 A1 | 2/2005 | Paul | |
| 2005/0093860 A1 | 5/2005 | Yanagisawa et al. | |
| 2005/0138560 A1 | 6/2005 | Lee et al. | |
| 2005/0144258 A1 | 6/2005 | Burckart et al. | |
| 2005/0183143 A1 | 8/2005 | Anderholm et al. | |
| 2005/0204148 A1 | 9/2005 | Mayo et al. | |
| 2005/0212797 A1 | 9/2005 | Lee et al. | |
| 2005/0223340 A1 | 10/2005 | Repka | |
| 2005/0223341 A1 | 10/2005 | Repka | |
| 2005/0223342 A1 | 10/2005 | Repka et al. | |
| 2005/0278650 A1 | 12/2005 | Sims et al. | |
| 2005/0288001 A1 | 12/2005 | Foster et al. | |
| 2006/0005114 A1 * | 1/2006 | Williamson | G06F 40/117 715/211 |
| 2006/0031914 A1 | 2/2006 | Dakss et al. | |
| 2006/0048058 A1 | 3/2006 | O'Neal et al. | |
| 2006/0106780 A1 | 5/2006 | Degan | |

(56) References Cited

U.S. PATENT DOCUMENTS

| | | |
|---|---|---|
| 2006/0129933 A1 | 6/2006 | Land et al. |
| 2006/0150149 A1 | 7/2006 | Chandhoke et al. |
| 2006/0167896 A1 | 7/2006 | Kapur et al. |
| 2006/0235973 A1 | 10/2006 | McBride et al. |
| 2006/0265495 A1 | 11/2006 | Butler et al. |
| 2006/0277553 A1 | 12/2006 | Henning et al. |
| 2007/0038931 A1 | 2/2007 | Allaire et al. |
| 2007/0055401 A1 | 3/2007 | Van Bael et al. |
| 2007/0121850 A1 | 5/2007 | Klos et al. |
| 2007/0174905 A1 | 7/2007 | Martherus et al. |
| 2007/0192613 A1 | 8/2007 | Amoroso et al. |
| 2007/0192727 A1 | 8/2007 | Finley et al. |
| 2007/0211065 A1 | 9/2007 | Feth et al. |
| 2007/0245243 A1 | 10/2007 | Lanza et al. |
| 2007/0271367 A1 | 11/2007 | Yardeni et al. |
| 2007/0282858 A1 | 12/2007 | Arner et al. |
| 2008/0005240 A1 | 1/2008 | Knighton et al. |
| 2008/0005247 A9 | 1/2008 | Khoo |
| 2008/0028341 A1 | 1/2008 | Szeliski et al. |
| 2008/0062969 A1 | 3/2008 | Picard et al. |
| 2008/0062970 A1 | 3/2008 | Picard et al. |
| 2008/0086456 A1 | 4/2008 | Rasanen et al. |
| 2008/0109396 A1 | 5/2008 | Kacin |
| 2008/0120336 A1 | 5/2008 | Bergman et al. |
| 2008/0189162 A1 | 8/2008 | Ganong |
| 2008/0201736 A1 | 8/2008 | Gordon et al. |
| 2008/0235189 A1 | 9/2008 | Rayman et al. |
| 2008/0270151 A1* | 10/2008 | Mahoney ............... G06Q 30/02 705/1.1 |
| 2008/0276271 A1 | 11/2008 | Anderson et al. |
| 2009/0013244 A1 | 1/2009 | Cudich |
| 2009/0019367 A1 | 1/2009 | Cavagnari et al. |
| 2009/0044138 A1 | 2/2009 | Rudolph et al. |
| 2009/0049385 A1 | 2/2009 | Blinnikka et al. |
| 2009/0066366 A1 | 3/2009 | Solomon |
| 2009/0083641 A1 | 3/2009 | Christy |
| 2009/0094544 A1 | 4/2009 | Savage |
| 2009/0100372 A1 | 4/2009 | Lauridsen |
| 2009/0133048 A1 | 5/2009 | Gibbs |
| 2009/0138508 A1 | 5/2009 | Tolle |
| 2009/0171968 A1 | 7/2009 | Kane et al. |
| 2009/0172021 A1 | 7/2009 | Kane et al. |
| 2009/0172597 A1 | 7/2009 | Mercer |
| 2009/0187825 A1 | 7/2009 | Sandquist et al. |
| 2009/0217187 A1 | 8/2009 | Kendall et al. |
| 2009/0222842 A1 | 9/2009 | Narayanan et al. |
| 2009/0259937 A1 | 10/2009 | Rohall et al. |
| 2009/0292584 A1 | 11/2009 | Dalal et al. |
| 2009/0292768 A1 | 11/2009 | Franke |
| 2010/0023849 A1 | 1/2010 | Hakim et al. |
| 2010/0037205 A1 | 2/2010 | Maillot et al. |
| 2010/0057415 A1 | 3/2010 | Chu et al. |
| 2010/0189131 A1 | 7/2010 | Branam et al. |
| 2010/0192132 A1 | 7/2010 | Yuan |
| 2010/0216443 A1 | 8/2010 | Jacobstein et al. |
| 2010/0251174 A1 | 9/2010 | Belandrino et al. |
| 2010/0277696 A1* | 11/2010 | Huebner ................ G03B 21/00 352/81 |
| 2010/0325674 A1 | 12/2010 | Lliu |
| 2011/0010307 A1 | 1/2011 | Bates et al. |
| 2011/0026898 A1 | 2/2011 | Lussier et al. |
| 2011/0055176 A1 | 3/2011 | Choi et al. |
| 2011/0082719 A1 | 4/2011 | Dutta |
| 2011/0191316 A1 | 8/2011 | Lai et al. |
| 2011/0225015 A1 | 9/2011 | Spivack et al. |
| 2011/0252094 A1 | 10/2011 | Sahasi et al. |
| 2011/0276372 A1 | 11/2011 | Spivack et al. |
| 2011/0289422 A1 | 11/2011 | Spivack et al. |
| 2012/0084292 A1 | 4/2012 | Liang et al. |
| 2012/0109966 A1 | 5/2012 | Liang et al. |
| 2012/0158902 A1 | 6/2012 | Udtke et al. |
| 2012/0191716 A1 | 7/2012 | Omoigui |
| 2012/0210247 A1 | 8/2012 | Khouri |
| 2012/0226984 A1 | 9/2012 | Bastide et al. |
| 2012/0246137 A1 | 9/2012 | Sallakonda et al. |
| 2012/0254454 A1 | 10/2012 | Margush et al. |
| 2012/0290399 A1 | 11/2012 | England et al. |
| 2012/0290950 A1* | 11/2012 | Rapaport ............ H04N 21/8358 715/753 |
| 2013/0036191 A1 | 2/2013 | Fink et al. |
| 2013/0132374 A1 | 5/2013 | Olstad et al. |
| 2013/0138585 A1 | 5/2013 | Forte |
| 2013/0215116 A1 | 8/2013 | Siddique et al. |
| 2013/0268872 A1 | 10/2013 | Yin et al. |
| 2014/0068779 A1 | 3/2014 | Tan et al. |
| 2014/0115466 A1 | 4/2014 | Barak et al. |
| 2014/0123014 A1 | 5/2014 | Keen |
| 2014/0126714 A1 | 5/2014 | Sayko et al. |
| 2014/0126715 A1 | 5/2014 | Lum et al. |
| 2014/0136528 A1 | 5/2014 | Anima et al. |
| 2014/0214691 A1 | 7/2014 | Morris, III |
| 2014/0229839 A1 | 8/2014 | Lynch et al. |
| 2014/0237381 A1* | 8/2014 | Socolof ................. G06Q 10/02 715/752 |
| 2014/0279049 A1 | 9/2014 | Wiseman |
| 2014/0289326 A1 | 9/2014 | McCormack et al. |
| 2014/0366098 A1 | 12/2014 | Savage et al. |
| 2015/0002619 A1 | 1/2015 | Johnston et al. |
| 2015/0006610 A1 | 1/2015 | Johnston et al. |
| 2015/0082021 A1 | 3/2015 | Mandyann et al. |
| 2015/0213145 A1 | 7/2015 | Baldwin |
| 2015/0278363 A1 | 10/2015 | Briere et al. |
| 2015/0304367 A1 | 10/2015 | Chan et al. |
| 2015/0365244 A1 | 12/2015 | Schmiltz et al. |
| 2016/0011729 A1* | 1/2016 | Flores .................... G06F 3/167 715/728 |
| 2016/0028790 A1 | 1/2016 | Eriksson et al. |
| 2016/0180248 A1 | 6/2016 | Regan |
| 2017/0046374 A1 | 2/2017 | Fletcher et al. |
| 2017/0140398 A1 | 5/2017 | Fleischman et al. |
| 2017/0243255 A1 | 8/2017 | Sahasi et al. |
| 2018/0033051 A1 | 2/2018 | Maynard et al. |
| 2018/0211285 A1 | 7/2018 | Todasco et al. |
| 2018/0262561 A1 | 9/2018 | Sahasi et al. |
| 2019/0108234 A1 | 4/2019 | Torres et al. |
| 2019/0108438 A1 | 4/2019 | Torres et al. |

FOREIGN PATENT DOCUMENTS

| | | |
|---|---|---|
| EP | 2261898 A1 | 12/2010 |
| WO | WO 02082815 A1 | 10/2002 |
| WO | WO 02093352 | 11/2002 |
| WO | WO 02097616 A1 | 12/2002 |
| WO | WO2009020770 A1 | 2/2009 |

OTHER PUBLICATIONS

Abla, G. et al., Advanced Tools for enhancing control room collaborations, Fusion Engineering and Design, vol. 81, Issues 15-17, 5th IAEA TM on Control, Data Acquisition, and Remote Participation for Fusion Research—5th IAEA TM, Jul. 2006, pp. 2039-2044, ISSN 0920-3796, DOI: 10.1016/j.jusengdes.200, 5 pages (2006).

Guthery, S., Kehr, R., and Posegga, J. 2001, How to turn a GSM SIM into a web server, In Proceedings of the Fourth Working Conference on Smart Card Research and Advanced Applications on Smart Card Research and Advanced Applications (Bristol, United Kingdom). J. Domingo-Ferrer, D. Chan, and A. Watson, Norwell, MA (2001).

Holmberg, et al., "Web Real-Time Communication Use Cases and Requirements"; dated Mar. 2015, 29 pages (2015).

Draft—C. Holmberg, et al., "Web Real-Time Communication Use Cases and Requirements"; dated Oct. 14, 2013 (25 pgs.).

Saint-Andre, P. 2005. Streaming XML with Jabber/XMPP. IEEE Internet Computing 9, 5 (Sep. 2005).

Sen, Sandip, An Automated Distributed Meeting Scheduler,PSU, Apr. 2007; http://citeseerx.ist.psu.edu/viewdoc/summary?doi=10.1.1.56.6862, 13 pages (2007).

Sinha, et al., Video Conferencing System, Columbia University, http://www.cs.columbia.edu/~sedwards/classes/2009/4840/reports/RVD-presentation.pdf (11 pgs.) (2009).

(56) References Cited

OTHER PUBLICATIONS

Best practices in Webcasting for Publishing; Author: ON24, Publication: 2006.

UoW-EauClaire Microsoft PowerPoint 2003, Sep. 2004, http://web.archive.org/web/20040919191008/http://www.uwec.edu/help/ppoint03.htm, archived: Sep. 19, 2004, printed: Jan. 10, 2008.

UoW-EauClaire Microsoft PowerPoint 2003, Dec. 2004, http://web.archive.org/web/20041221201404/www.uwec.edu/help/PPoint03/webenvir.htm, archived: Dec. 21, 2004, printed: Jan. 10, 2008.

Microsoft Corporation, Oct. 2004, COM: Component Object Model Technologies, http://web.archive.org/web/20041023025124/http://www.microsoft.com/com/default.mspx, archived: Oct. 23, 2004, printed: Jan. 10, 2008.

3D Object Modeling and Recognition Using Local Affine-Invariant Image Descriptors and Multi-View Spatial Constraints—Fred Rothganger and Svetlana Lazebnik; Jean Ponce—Department of Computer Science and Beckman Institute, University of Illinois—Cordelia Schmid Inria, France-International Journal of Computer Vision 66(3), 231-259, 2006.

Efficient 3D shape matching and retrieval using a concrete radialized spherical projection representation—Panagiotis Papadakis, Ioannis Pratikakis, Stavros Perantonis, Theoharis Theoharis—Greece—Pattern Recognition 40 (2007)—ScienceDirect.

"Breeze Manager User Guide," Copyright © 2005 Macromedia, Inc., Second Edition: Jun. 2005, 306 pages.

"Breeze Meeting User Guide for Meeting Hosts and Presenters", Copyright © 2005 Macromedia, Inc., Third Edition: Sep. 2005, 130 pages.

Freeman et al.,"Creative Collaboration between Audiences and Musicians in Flock," Georgia Tech Center for Music Technology, Feb. 2010, 17 pages. http://distributedmusic.gatech.edu/jason/publications/pdf_files_of_publications/flock-digitalcreativity.pdf.

Suduc et al., "Exploring Multimedia Web Conferencing," Valahia University of Targoviste, Exploring Multimedia Web Conferencing (Year: 2009), Mar. 2009, 14 pages. https://www.researchgate.net/profile/Suduc_Ana-Maria/publication/26849386.

Marni Gunther, "Webcasting 101: Online Broadcasting in the Meetings and Events Industry", Netbriefings, Inc., Jul. 2008, 2 pages. http://www.netbriefings.com/pdf/0807-MtgsMNHospitality.pdf.

* cited by examiner

62 118

AUDIENCE BINNING USER INTERFACE
GENERATION COMPONENT
202

AUDIENCE BINNING SYNCHRONIZATION
COMPONENT
204

AUDIENCE BINNING COMPONENT
206

FIG. 7

| User Identification | User Tags |
|---|---|
| user_1 | interest_1, interest_3, ... interest_k; domain_1, ... domain_i |
| user_2 | interest_2, interest_4, ... interest_l; domain_2, ... domain_j |
| ... | interest_3, interest_5, ... interest_m; domain_3, ... domain_k |
| user_i | interest_3, interest_5, ... interest_k; domain_4, ... domain_l |
| ... | interest_2, interest_4, ... interest_l; domain_5, ... domain_m |
| user_j | interest_1, interest_3, ... interest_m; domain_6, ... domain_n |

AUDIENCE BINNING SYSTEM AND METHOD FOR WEBCASTING AND ON-LINE PRESENTATIONS

FIELD

The disclosure relates generally to virtual events and live webcasting, especially when there is a need for live communications among audience members.

BACKGROUND

Group conversations are a difficult social exercise in itself. This difficulty is magnified by several orders when conversation goes online, size of group increases, groups are malformed, contextual information is insufficient (or incorrect) and return on investment for participants' time is low.

Group chatting is among the most popular form of communication for both personal and professional use. Needless to say there exist several dozen solutions that enables group chatting. However, the number of solutions and their effectiveness decrease with increasing size of group, especially in a professional setting where return on investment of time is measured. For example, commercial solutions like Campfire and HipChat caters to teams where context is well-defined and size is very small, namely team members. Freemium solutions like Yahoo, Facebook or Skype Chat are built for personal use with friends and family. Thus, both these existing systems does not scale well or handle larger groups, such as the groups in a virtual event or live webcasting.

Curated chat groups (or chat rooms) are one way to look into this problem but it's a labor intensive method. However, curated groups cannot scale with the size of group nor can it reflect the dynamics of live groups. Often, the group owner of the curated group assumes the responsibility of labeling groups. However, the manual labeling cannot scale with the size of group or reflect its live dynamics.

Some other existing systems may provide the ability to display the number of active participants using heat map or numeric labeling. However, this is both insufficient and incorrect because the number of active participants still does not reflect group context or quality.

BRIEF DESCRIPTION OF THE DRAWINGS

FIG. 7 illustrates an example of the client and backend components of the audience binning system;

FIG. 9 illustrates an example of table of user interest and experience tags;

DETAILED DESCRIPTION OF ONE OR MORE EMBODIMENTS

The disclosure is particularly applicable to an audience binning system and method for a webcast or virtual event presented using an online presentation system and it is in this context that the disclosure will be described. It will be appreciated, however, that the audience binning system and method has greater utility since it may be used to perform binning for other systems, such as chat rooms and the like in which it is desirable to be able to assess the interests and experience of each member and distribute the audience binning information.

The problem identified above may be tackled using the virtual audience binning system and method described below. The system and method dynamically labels a group with information derived from its current participants and possibly their conversations through data mining. New audience would use this contextual information to decide their relevance and interest with the groups as they are now. Furthermore, using the system, the quality of virtual binning increases with number of participants that solves the problem of size so that it is a solution that's built to work at scale.

With the introduction of the virtual audience binning, chat rooms and similar communication experience will be significantly enhanced. Specifically, audiences will be automatically grouped and presented as interactive hexagonal bins "beehives" of their interests or expertise. Each interest and expertise is assigned a color tag. One or more of these tags are selected by users at the time of registration. Now, a disclosure of an on-line web-based presentation system is provided wherein the on-line web-based presentation system may include the system and method for audience binning.

Figure 1:
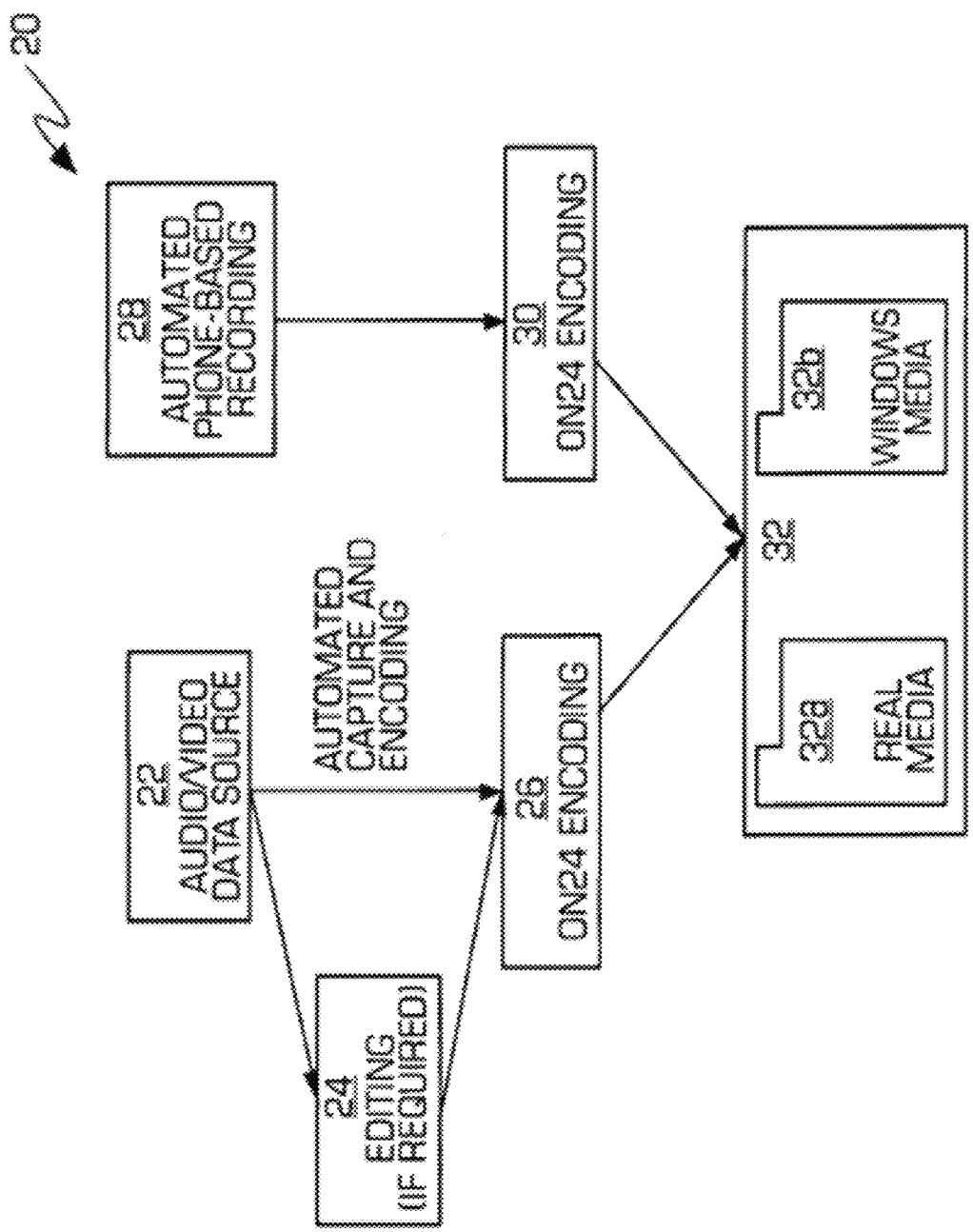
FIG. 1 is a diagram illustrating a method for asset acquisition for an online presentation method.

FIG. 1 is a diagram illustrating a method 20 for asset acquisition for online presentation event system. As shown, an audio/video or audio data source 22 is edited in step 24 if necessary or is automatically captured. In step 26, the data source 22 is encoded. Alternatively, an automated phone-based recording source 28 is encoded in step 30. The encoded data may then be stored in a media database 32, such as in a real media format 32a and/or a windows media format 32b. In this manner, a data source/piece of media is prepared for distribution using an event system, an example of which is shown in FIG. 2.

Figure 2:
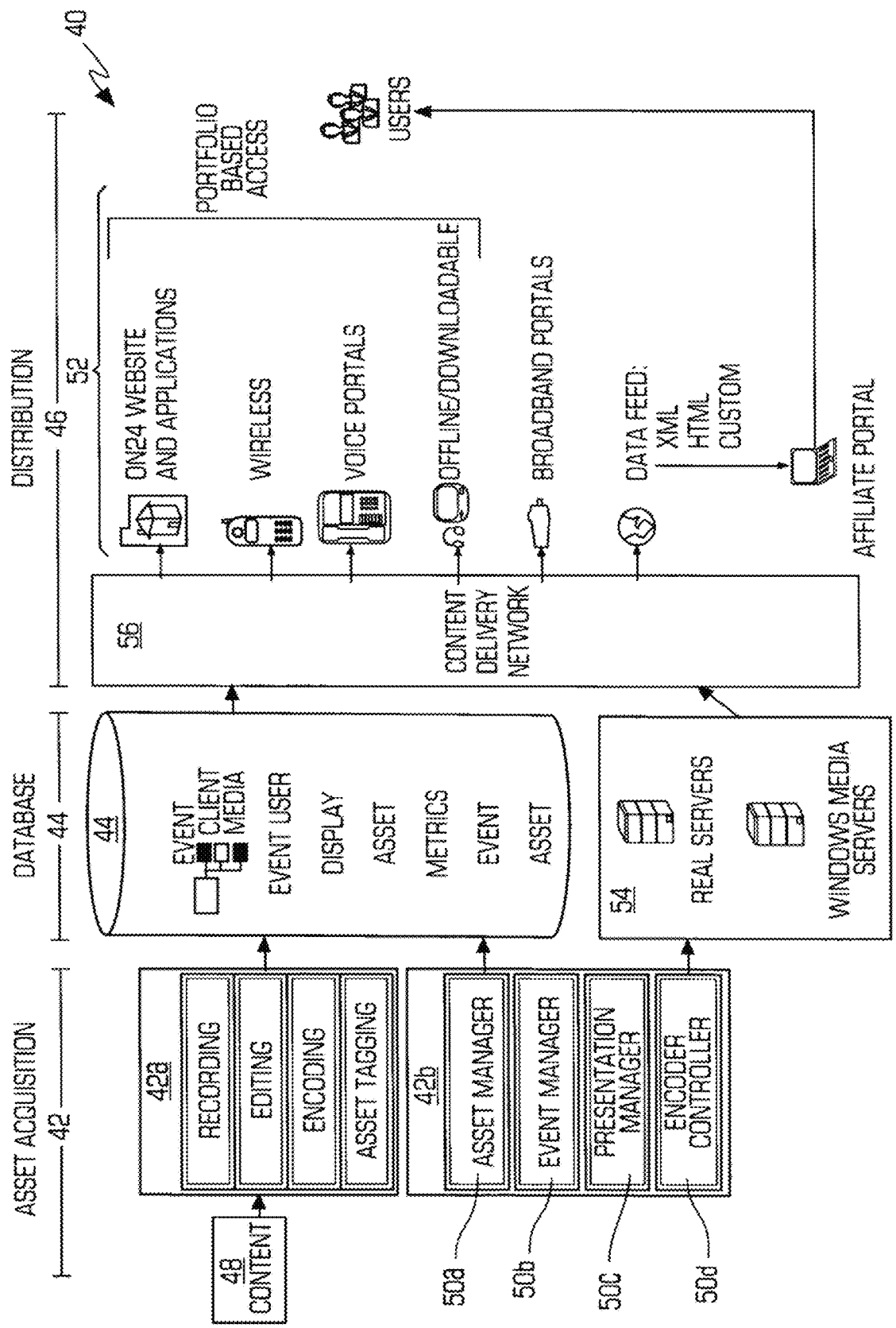
FIG. 2 is a diagram illustrating an example of an online presentation system that may use the presentation timeline annotation system.

FIG. 2 is a diagram illustrating an event system 40 into which the presentation timeline annotation apparatus may be incorporated. The event system 40 may comprise an asset acquisition and event management portion 42, a database portion 44 and a distribution portion 46 wherein a piece of media/content 48 is input into the event system 40 in order to distribute that content/piece of media during the event.

Generally, each element of the event system being described is implemented in software wherein each portion may be one or more software modules and each software modules may be a plurality of computer instructions being executed to perform a particular function/operation of the system. Each element of the system may thus be implemented as one or more computer resources, such as typical personal computers, servers or workstations that have one or more processors, persistent storage devices and memory with sufficient computing power in order to store and execute the software modules that form the frame event system in accordance with the invention. The event system may generate an event that is provided to one or more event clients 52 wherein each client is a computing resource, such as a personal computer, workstation, cellular phone, personal digital assistant, wireless email device, telephone, etc. with sufficient computing power to execute the event client located on the client wherein the client communicates with the event system over a wired or wireless connection.

In more detail, the asset acquisition and event management portion 42 may further comprise an asset acquisition portion 42a and an event management portion 42b wherein the asset acquisition portion performs one or more of the following functions: recording of the piece of media/content, editing of the piece of media/content, encoding of the piece of media/content and asset tagging. The event manager module 42b further comprises an asset manager module 50a, an event manager module 50b, a presentation manager module 50c and an encoder controller 50d. The asset manager module 50a, prior to an event, imports/exports content/pieces of media into/from a library of media as needed and manages the assets for each event presentation. The event manager module 50b may perform actions/function prior to and after an event. Prior to a particular event, the event manager module may reserve the event in the system (both resources and access points), set-up an event console which a user interacts with to manage the event and then send messages to each recipient of the upcoming event with the details of how to access/operate the event. After a particular event, the event manager module 50b may permit a user to import an old event presentation into the system in order to re-use one or more pieces of the old event presentation. The presentation manager module 50c, during a particular event presentation, generates an event file with the slides of the event presentation, URLs and polls to an encoder controller to distribute the particular event presentation to the users. The encoder controller 50d encodes the event presentation stream to one or more distribution server 54 that distributes the event presentation to the users.

As shown in FIG. 2, the database 44 may include data about each event, including the clients to which the event is being provided and the media associated with the event, one or more event users, the display of the particular event, the assets associated with the event, the metrics for the event and other event data. In combination with this data in the database for a particular event, operations and commands from the event manager module 42b are downloaded to the distribution servers 54 that distribute each event to each client 52 for the particular event over a distribution network 56. As shown, the event/presentation may be distributed to one or more different clients 52 that use one or more different methods to access the event. The clients 52 may include a client that downloads the presentation and then views the presentation offline.

Figure 3:
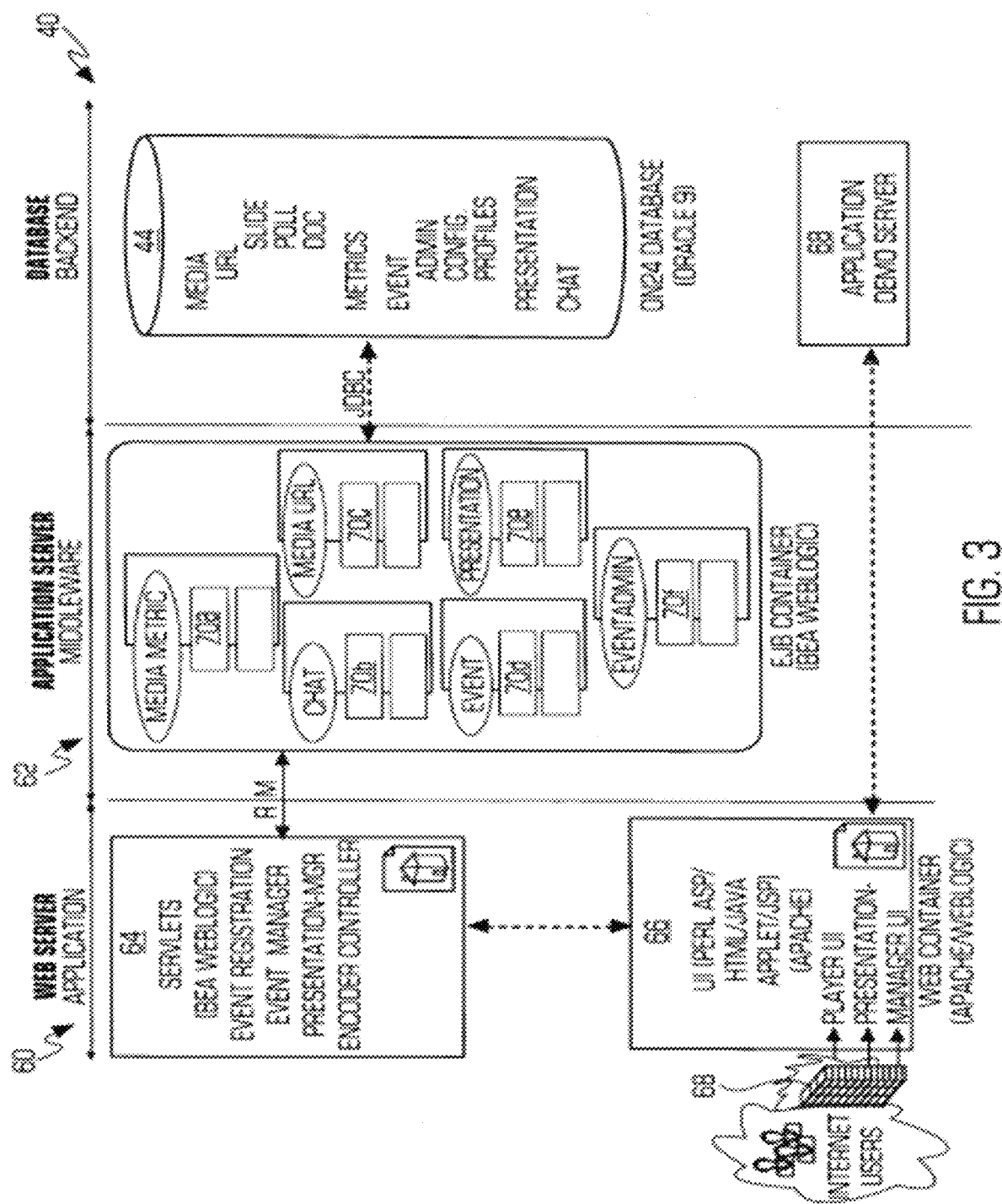
FIG. 3 illustrates a system architecture of the online presentation system shown in FIG. 2.

FIG. 3 illustrates more details of the event system shown in FIG. 2. The event system may include a web server portion 60, an application server portion 62 and the database portion 40 (with the database 44) shown in FIG. 2. Each of these portions may be implemented as one or more computer resources with sufficient computing resources to implement the functions described below. In a preferred embodiment, each portion may be implemented as one or more well-known server computers. The web server portion 60 may further comprise one or more servlets 64 and a web container portion 66 which are both behind a typical firewall 68. In a preferred embodiment of the invention, the servlets reside on a BEA Weblogic system which is commercially available and may include an event registration servlet, an event manager module servlet, a presentation manager module servlet and an encoder controller servlet that correspond to the event manager module 50b, presentation manager module 50c and encoder controller 50c shown in FIG. 2. Each of these servlets implement the functions and operations described above for the respective portions of the system wherein each servlet is a plurality of lines of computer code executed on a computing resource with sufficient computing power and memory to execute the operations. The servlets may communicate with the application server portion 62 using well-known protocols such as, in a preferred embodiment, the well-known remote method invocation (RMI) protocol. The servlets may also communicate with the web container portion 66 which is preferable implemented using an well-known Apache/Weblogic system. The web container portion 66 generates a user interface, preferably using Perl, Active Server Page (ASP), HTML, XML/XSL, Java Applet, Javascript and Java Server Pages (JSPs.) The web container portion 66 may thus generate a user interface for each client and the presentation manager module user interface. The user interface generated by the web container portion 66 may be output to the clients of the system through the firewall as well as to an application demo server 68 that permits a demo of any presentation to be provided.

The application server portion 62 may preferably be implemented using an Enterprise JavaBeans (EJBs) container implemented using a BEA Weblogic product that is commercially sold. The application server management portion 62 may be known as middleware and may include a media metric manager 70a, a chat manager 70b, a media URL manager 70c, an event manager 70d, a presentation manager 70e and an event administration manager 70f which may each be software applications performed the specified management operations. The application server portion 62 communicates with the database 44 using a protocol, such as the well-known Java Database Connectivity (JDBC) protocol in a preferred embodiment of the invention. The database 44 may preferably be implemented using an Oracle 8/9 database product that is commercially available. As shown, the database 44 may include media data including URL data, slide data, poll data and document data. The database 44 may further include metric data, event data and chat data wherein the event data may further preferably include administration data, configuration data and profile data.

Figure 4:
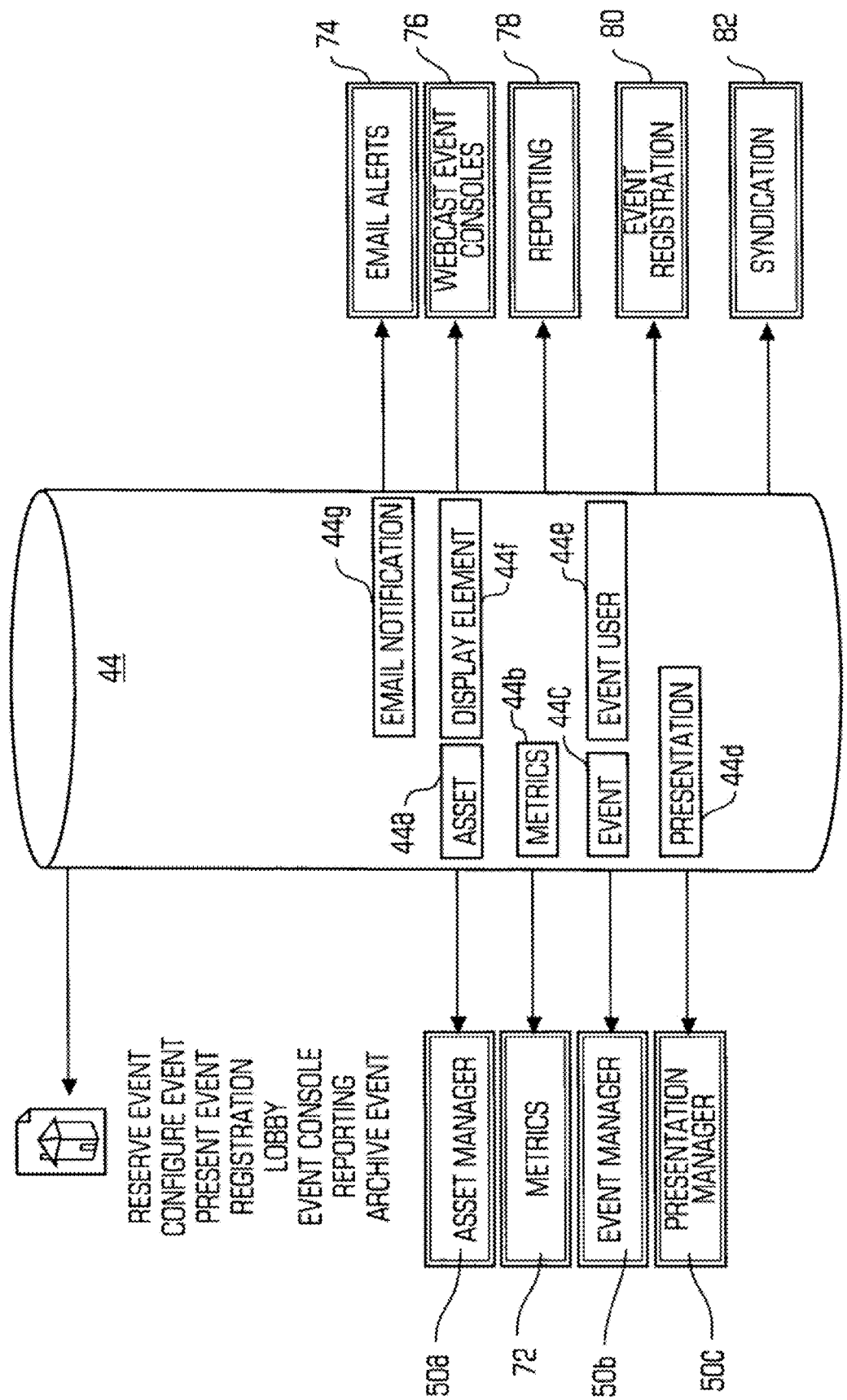
FIG. 4 is a functional diagram of the interacting components of the online presentation system in FIG. 3.

FIG. 4 is a diagram illustrating more details of the event database 44 in FIG. 3. As shown in FIG. 4, the database may generate data that is used to implement a function to reserve an event, to configure an event, present an event, for registration, for the lobby for the event console, for reporting and for archiving an event. The database may include asset data 44a that may be provided to the asset manager module 50a, metrics data 44b that is provided to a metric module 72, event data 44c that is provided to the event manager module 50b, presentation data 44d that is provided to the presentation manager module 50c, event user data 44e that is provided to an event registration module 80, display element data 44*f* that is provided to an event consoles module 76 and email notification data 44*g* that is provided to an email alerts module 74. The database may also store data that is used by a reporting module 78 to generate reports about the events and presentations provided by the system. The database may also store data that is used by a syndication module 82 to syndicate and replicate existing presentations.

Figure 5:
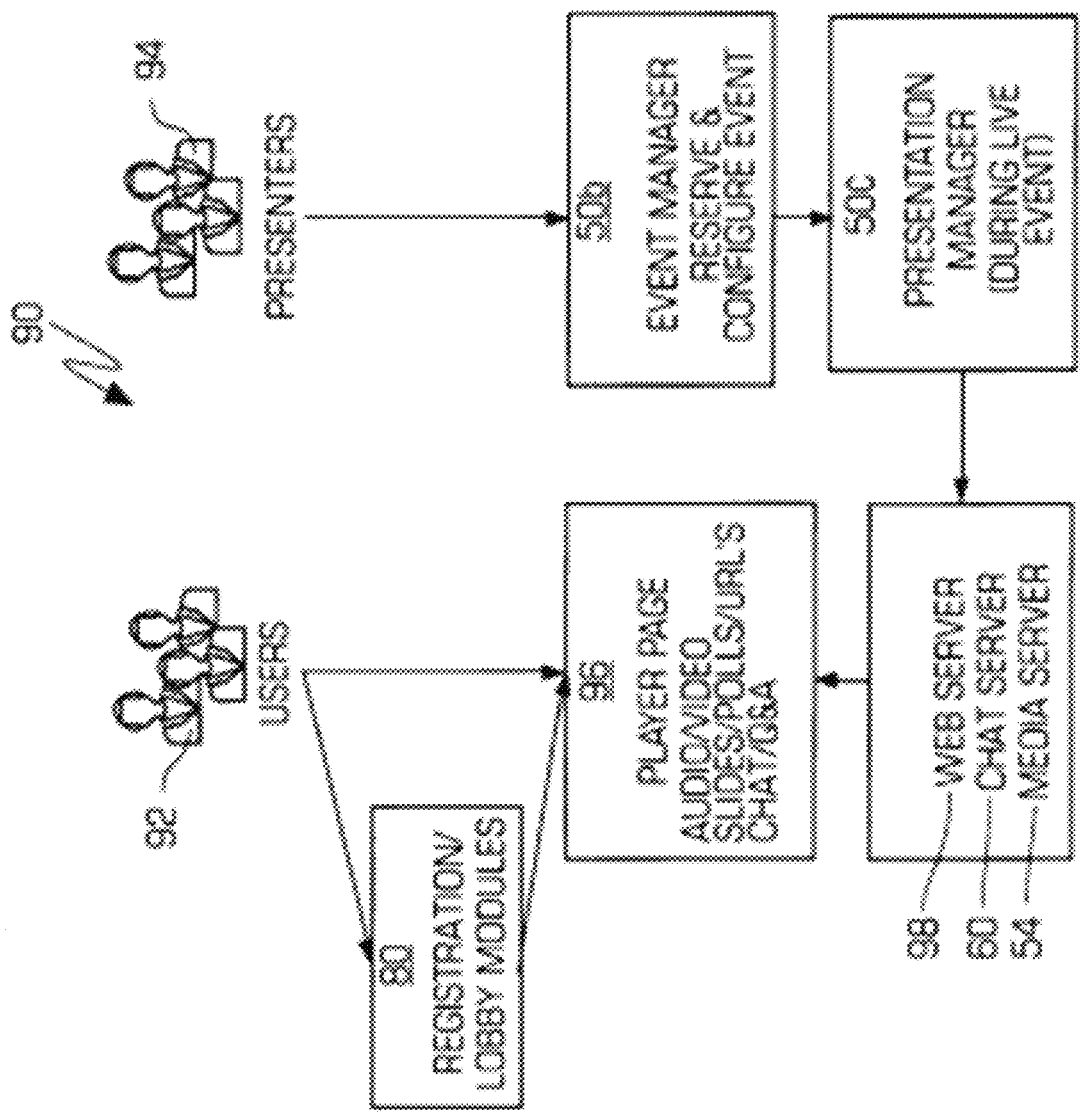
FIG. 5 is a diagram illustrating a presentation workflow.

FIG. 5 is a diagram illustrating an event center 90 that may be utilized by one or more users 92 that are presented with a presentation by the system and one or more presenters 94 who utilize the system to present presentations to the users 92. The users 92 may interact with a registration and lobby modules 80 that permit the users to register with the system and schedule a presentation to view. In response to a successful registration, the user may be presented with a player page 96, such as a web page provided to a client computer of the user, that provides the audio and visual data for the presentation, slides, polls and URLs for the presentation, chat sessions and question and answers for a particular presentation. The data in the player page 96 is provided by the web server 60, the media server 54 and a chat server 98 that provides the chat functionality for a presentation. The presentation data for a live event presentation is provided to the servers 54, 60 and 98 by the presentation manager module 50*c*. The presenters 94 may utilize the event manager module 50*b* to reserve an event and/or configure an event. Once the event is reserve and configured, the presentation data is forwarded to the presentation manager module 50*c*.

Figure 6:
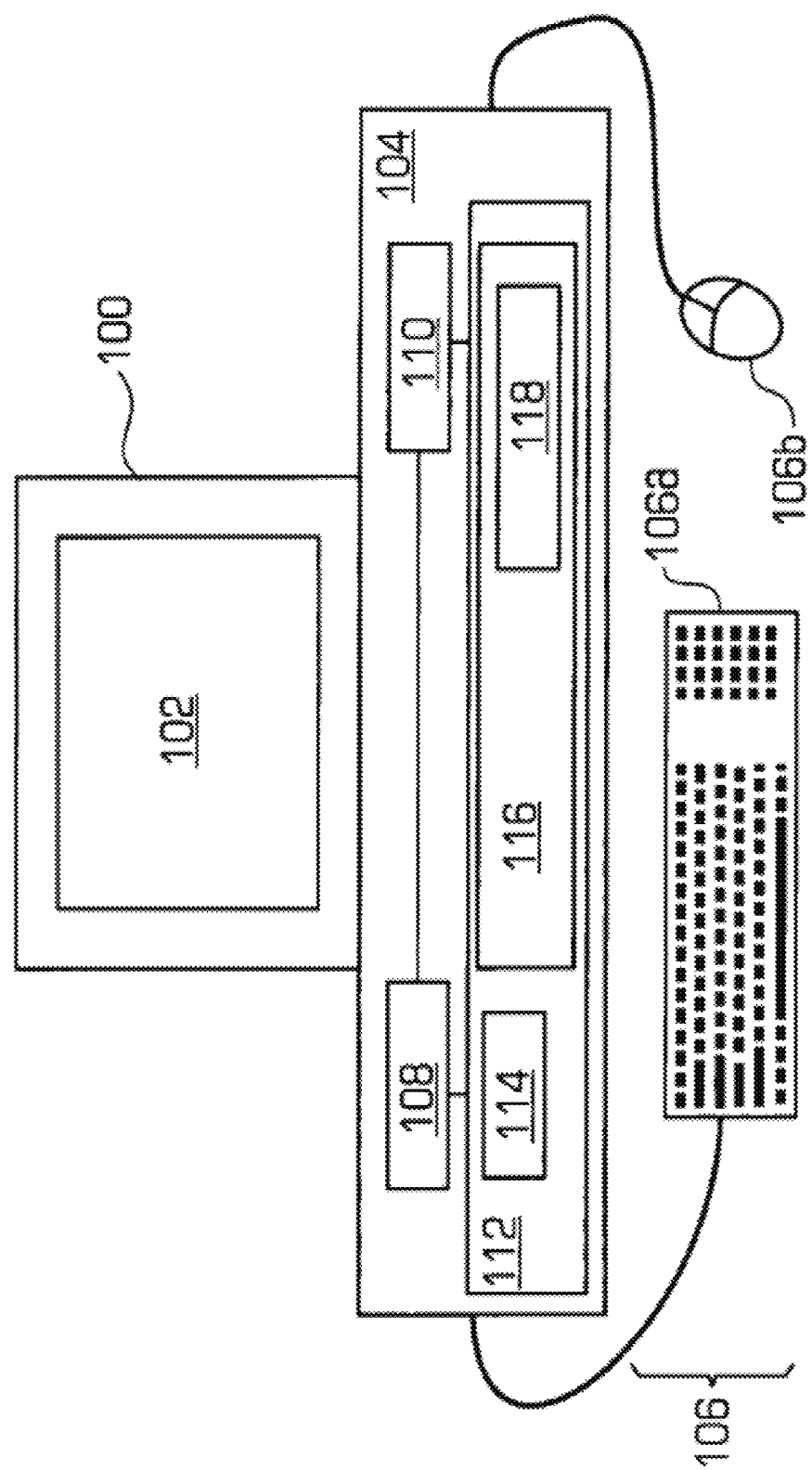
FIG. 6 is a diagram illustrating an example of an online presentation client that may incorporate part of the audience binning system.

FIG. 6 is a diagram illustrating an example of an online presentation client 100 that may incorporate the presentation timeline annotation apparatus. The event client 100 may be implemented as a personal computer, workstation, PDA, cellular phone and the like with sufficient computing power to implement the functions of the client as described below. In the example shown in FIG. 6, the event client may be a typical personal computer that may further comprise a display unit 102, such as a CRT or liquid crystal display or the like, a chassis 104 and one or more input/output devices 106 that permit a user to interact with the client 100, such as, for example, a keyboard 106*a* and a mouse 106*b*. The chassis 104 may further include one or more processors 108, a persistent storage device 110, such as a hard disk drive, optical disk drive. tape drive, etc., and a memory 112, such as SRAM, DRAM or flash memory. In a preferred embodiment, the client is implemented as one or more pieces of software stored in the persistent storage device 110 and then loaded into the memory 112 to be executed by the processor(s) 108. The memory may further include an operating system 114, such as Windows, and a typical browser application 116, such as Microsoft Internet Explorer, Mozilla Firefox or Netscape Navigator and an event console module 118 (including a slide, polls, survey, URL, Q&A) that operates within the browser application. The client side of the system/apparatus is implemented as HTML and Javascript code that is downloaded/streamed to the client 100 during/prior to each presentation so that the synchronization of the assets does not require separate client software downloaded to the client.

Figure 10:
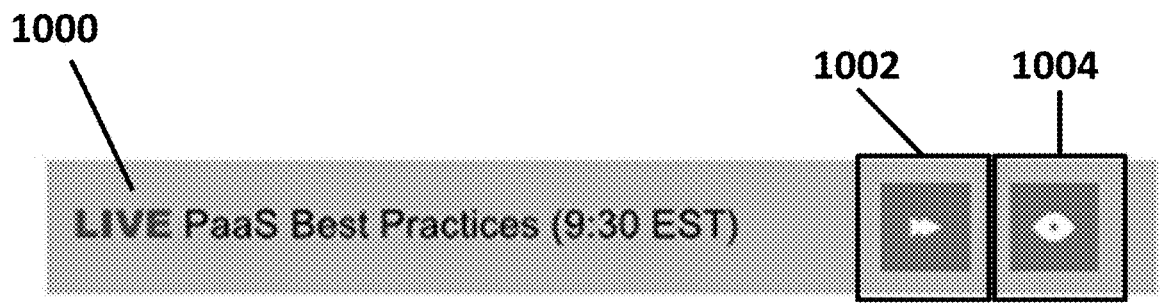
FIG. 10 illustrates an example of webcast user interface with actionable buttons including audience binning.
Figure 11:
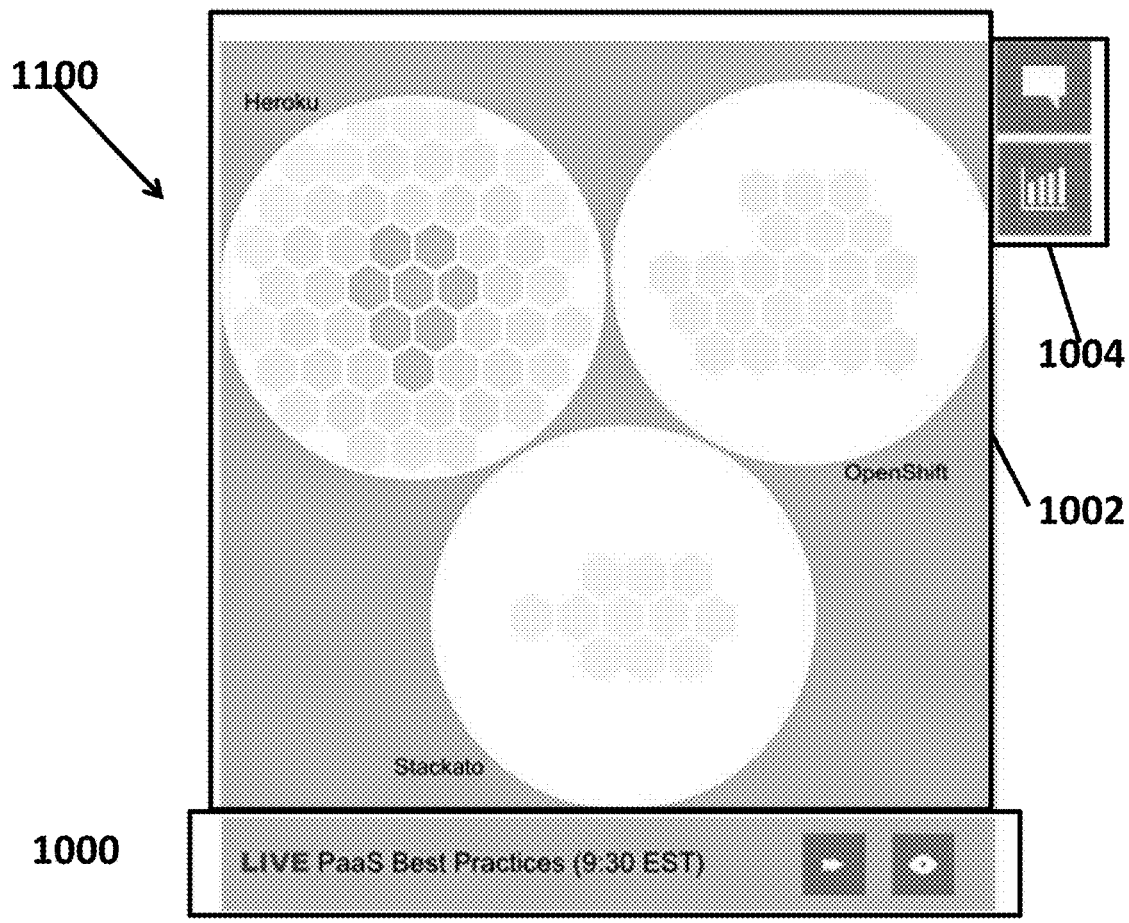
FIG. 11 illustrates an example of a webcast user interface with an audience binning portion.

The audience binning system may have a client-side element (an example of the user interface of which is shown in FIGS. 10-11) and backend components. Specifically, the backend components may be responsible for user modeling, syncing user status across clients and optionally performing mining of chat conversations. User modeling and mining were used in a broad sense. Mining techniques could be used (1) extract topic of conversations, (2) user sentiments about a given topic and (3) associate topics with users. The client side components may include binning logic, visualization and behavioral aspects as now described with reference to FIG. 7.

FIG. 7 illustrates an example of the client 118 and backend 62 components of the audience binning system. The audience binning system may include an audience binning user interface generation component 202 that may be part of the client and the audience binning user interface generation component may generate the user interfaces of the audience binning system such as shown, for example, in FIGS. 10-11. In addition, the audience binning system may include a binning synchronization component 204 that may be part of the backend/middleware and may distribute any audience binning data for each client to any other clients of the audience members of the presentation system. A single instance or a list of JSON data is used to synchronize user states and data. For example, iOS and Mac OS X system uses their propriety iCloud data structure to sync application and game states. WebSocket are used in HTML5 applications to push synced data to various clients. In addition, the audience binning system may include an audience binning component 206 that may part of the client and may generate the audience binning based on each user's interests and preferences as described in more detail below in FIGS. 12A and 12B. The components of the system shown in FIG. 7 may each be implemented in hardware, software or a combination of hardware and software. In a hardware/software implementation, each component may be a plurality of lines of computer code that may be resident in the memory of the cloud computing resources or one or more server computing resources and executed by the processor of the cloud computing resources or one or more server computing resources. Alternatively, each component may be a piece of hardware that implements the operations and processes described. For example, each component may be a programmable logic device, a microprocessor or microcontroller with microcode, an application specific integrated circuit and the like.

Figure 8:
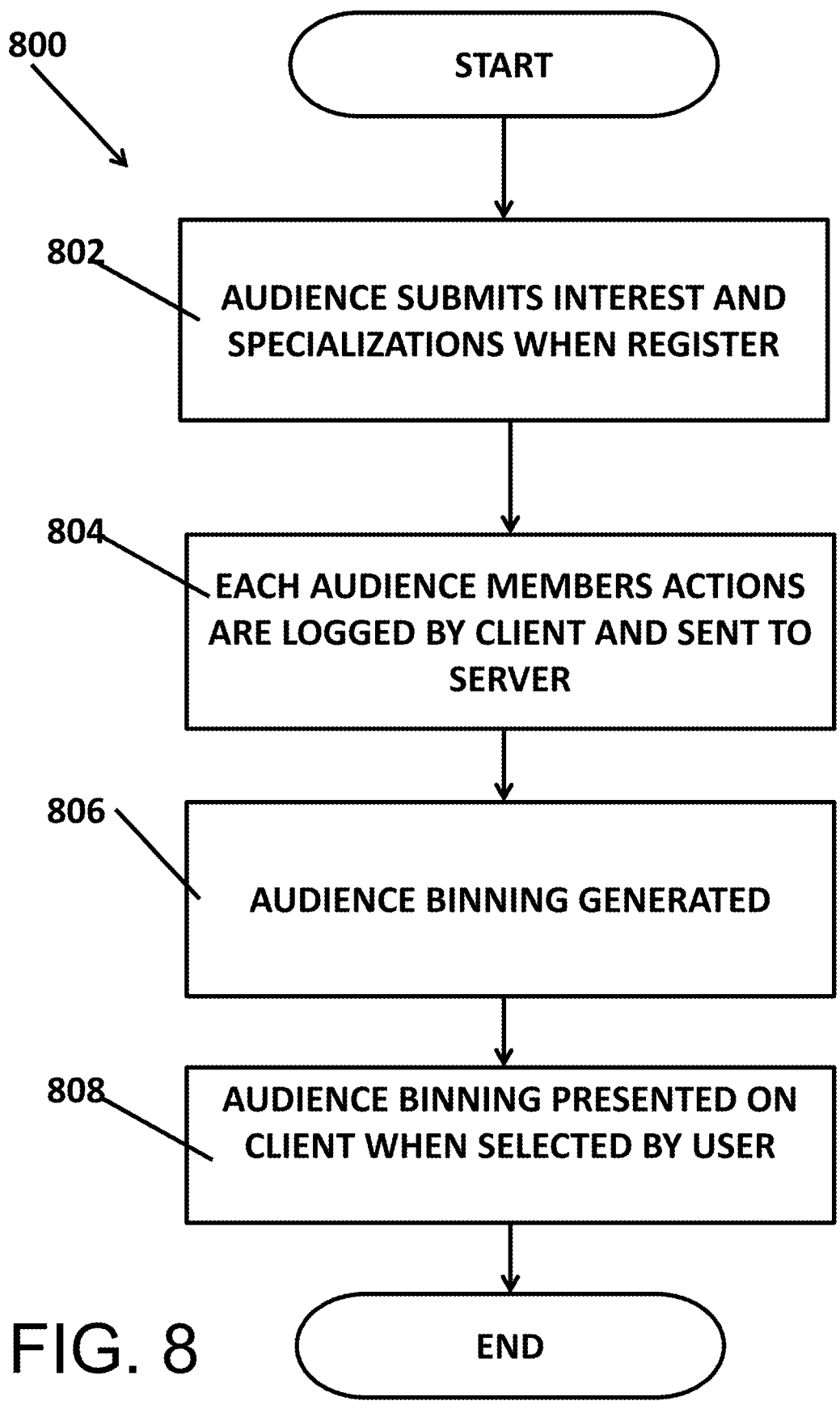
FIG. 8 illustrates a method for audience binning that may be carried out by the backend components in FIG. 7 and the client shown in FIG. 6.

FIG. 8 illustrates a method 800 for audience binning that may be carried out by the backend components in FIG. 7 and the client shown in FIG. 6. In the method, each audience member of the presentation system (or other system) may submit interests and expertise when the audience members registers (802). An example of a table of the user interests and expertise are shown in FIG. 9. For example, in one implementation, at the time of registering for a webcast or virtual event audiences for the online presentation system in FIGS. 1-6 can feed their interests and specialization as tags or keywords. Submitted tags are stored in the cloud and synced with other active clients by the audience sync component 204.

All examples use JSON data structure in JavaScript execution environment. JSON is easily portable to other programming languages and environment.

Example 1

User data creation on sign-up
var user_data={
user_name: 'John Appleseed',
user_id: john@appleseed.com,
user_tags: ['tag_1', 'tag_2', 'tag_3']
. . .
}

Example 2

Server-side would inverse these user data into tag-user maps. This is sent to every client on loading the app for the first time.

```
var tag_list=[{
tag_id: 'tag_123_456',
tag_name: 'tag_1',
users: ['john@appleseed.com', 'foo@bar.com', ... ]
}, {
tag_id: 'tag_976_456',
tag_name: 'tag_2',
users: ['john@appleseed.com', 'user@domain.
   com', ... ]
}]
```

Example 3

Server would push updated and synced user data to the client every few seconds.

```
var diff_tags=[{
tag_id: 'tag_976_456',
new_user_joined:        ['user2@domain2.com',
   'user3@domain3.com'],
old_user_left:          ['user1@domain1.com',
   'user4@domain4.com']
}];
```

Clients will use this pushed data to update their data model and reflect the changes in binning maps.

In the method, each audience member may take actions that may be logged by the client and sent to the backend system (804.) For example, in the online presentation system, the attendees take several actions during course of their session including but not limited to opening and viewing a webcast, listening to an audiocast, reading media slides, navigating across event locations and participating in virtual chat with other audiences. These are among the meaningful actions where virtual binning can be introduced. Client notifies server with users' action, which is then synced with other active clients over the socket or long-polling by the binning synch component 204. The client may generate an audience binning user interface (806.) For example, as shown in FIG. 10, a user interface 1000 for a presentation, such as a webcast or virtual event in the online presentation system, may be generated. The user interface may include actionable buttons or labels 1002, 1004 that may be placed over each webcast, audio cast, document, slides and location. For example, as shown in FIG. 10, the buttons may include a play/particular button 1002 so that an audience member can participate in the presentation and an audience binning button 1004. Clicking or hovering over these buttons display an image of virtual binning graph as shown in FIG. 11 (808) that details the composition of audiences who are currently viewing, listening or reading the underlying content. For example, as shown in FIG. 11, a user interface 1100 may include the presentation user interface and a binning user interface 1102. The binning user interface 1102 may also have additional actionable buttons, e.g. *Join Conversation, Ignore Conversation, Show Trending Topics and Show Conversation Statistics*. For example, as shown in FIG. 11, the buttons 1104 may include a join conversation button and a show trending topics. For example, clicking on Join Conversation button will open an existing chat widget in a well-defined context.

The method may thus generate audience binning user interfaces and may allow privileged members (e.g., members who have special access privileges, etc.) to initiate and engage with the right audience at the right time. Privileged users are defined by webcast (event) creator using managerial or administrative tools. They can interact and broadcast custom messages and media to the group members. It is analogous to posting an event flyer on the college notice board versus reaching out to specific interest group (club) and discussing the event in person. Now, more details of an implementation of the process for generating the audience binning is described in more detail.

Figure 12A:
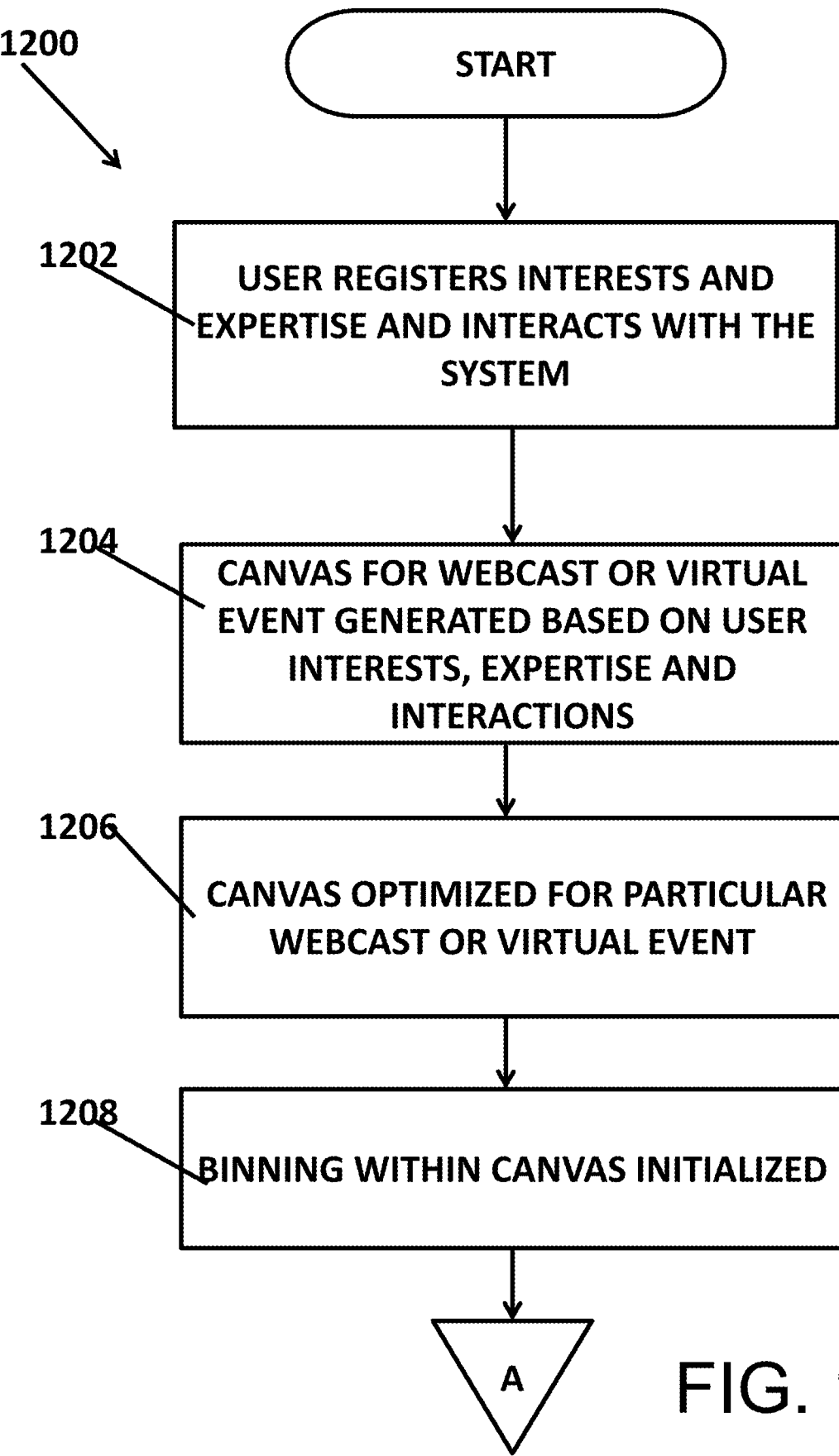
FIGS. 12A-B illustrate more details of an implementation of the audience binning.
Figure 12B:
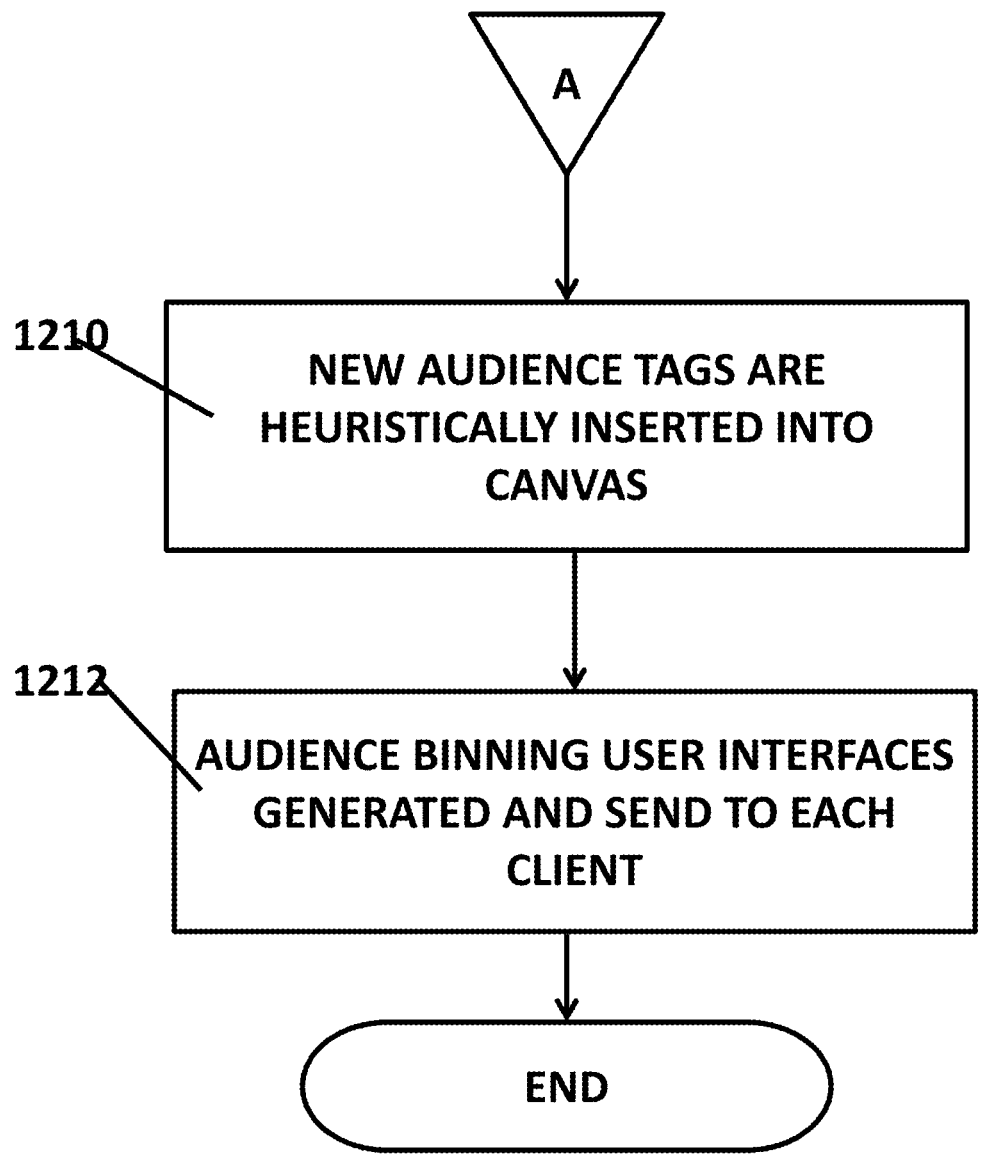
Figure 13:
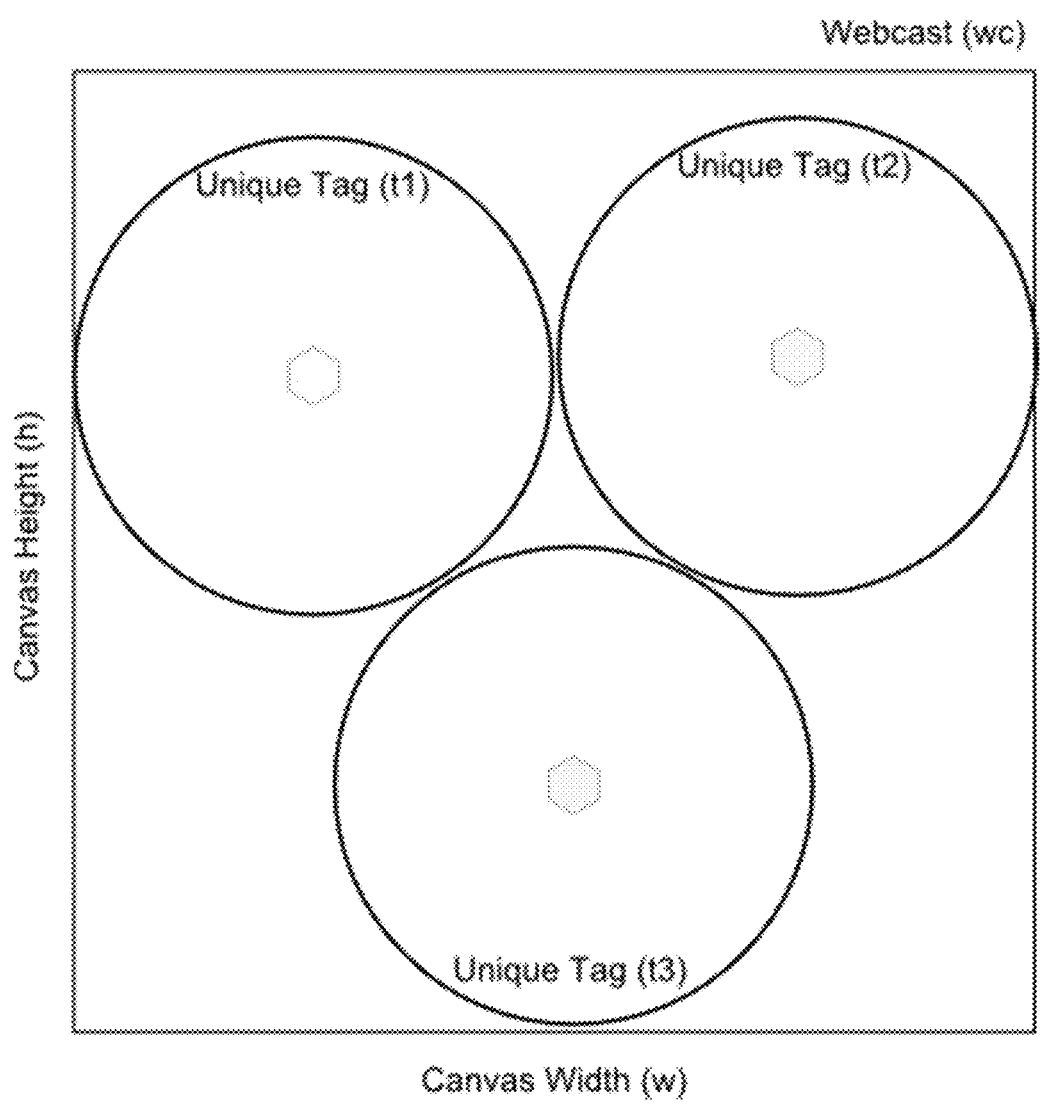
FIG. 13 illustrates an example of a canvas for a webcast used for audience binning.

FIGS. 12A-B illustrate more details of an implementation 1200 of the audience binning. The processes of the method 1200 described below may be carried out by the client shown in FIG. 6 and the components of the client such as the binning component 206 shown in FIG. 7. Thus, each client (for each user/audience member) performs its own audience binning based on the interests and expertise of the user of the particular client as well as the interests and expertise of the other users/audience members of the system that have been synched to the client. First, each user/audience members registers with the system, indicates interests and expertise and interacts with the system (1202.) Thus, a user u registers with the system and their interest(s) and expertise(s) are represented as tags t1, t2, t3 . . . ti. User interests and expertise are similar to what we find in sites like LinkedIn. Example: If the webcast or event is about Cloud Computing then list of use interests could be 'Wearables', 'Smart Appliances', 'Smart Cars', 'Smartphones 2.0', 'Smart Travel', 'Personal Fitness', 'Health Care', 'Personalized Marketing', 'Customized Shopping', 'Personal Finance', 'The Digital Divide', 'Mobile Cash & Markets', 'Virtual Reality'. Each user may then click a button to watch a webcast, listen to an audio cast or read a slideshow. The method may then generate a canvas c of width w and height h in the DOM (Document Object Model (DOM) is a programming interface for HTML, XML and SVG documents). DOM provides APIs to get and set dimensions of various DOM elements like body, canvas and div etc. <canvas> is a HTML element which can be used to draw graphics using scripting (usually JavaScript). An example of the canvas is shown in FIG. 13 for a particular webcast. During this process, a total number of unique tags |Σti| is extracted out of all the viewer of the webcast (wc) based on the user data from the client and the other data from the other clients that has been synched to the client. Then, a total of |Σti| number of circles of identical radii are graphed and fitted into the canvas c using Circle Packing algorithm and the circles are scaled to maximize the packing density. Circle packing algorithms are described generally in more detail at http://en.wikipedia.org/wiki/Circle_packing_theorem which is incorporated herein by reference. Thus, as shown in the example in FIG. 13, there may be three unique tags which results in three circles centered around each tag within the canvas.

The method may then optimize the canvas for a particular event, such as a webcast or virtual event in the online presentation system (1206.) For example, for very large size audiences, sparsely populated tags can be removed or scaled down. Then, each remaining tag has a pre-assigned color, e.g. t1→ . . . , t2→ . . . and t3→ . . . so that the user can easily distinguish each tag in the user interface. Furthermore, the alpha opacity values of colors tags are reduced by 90% to 0.10.

Figure 14:
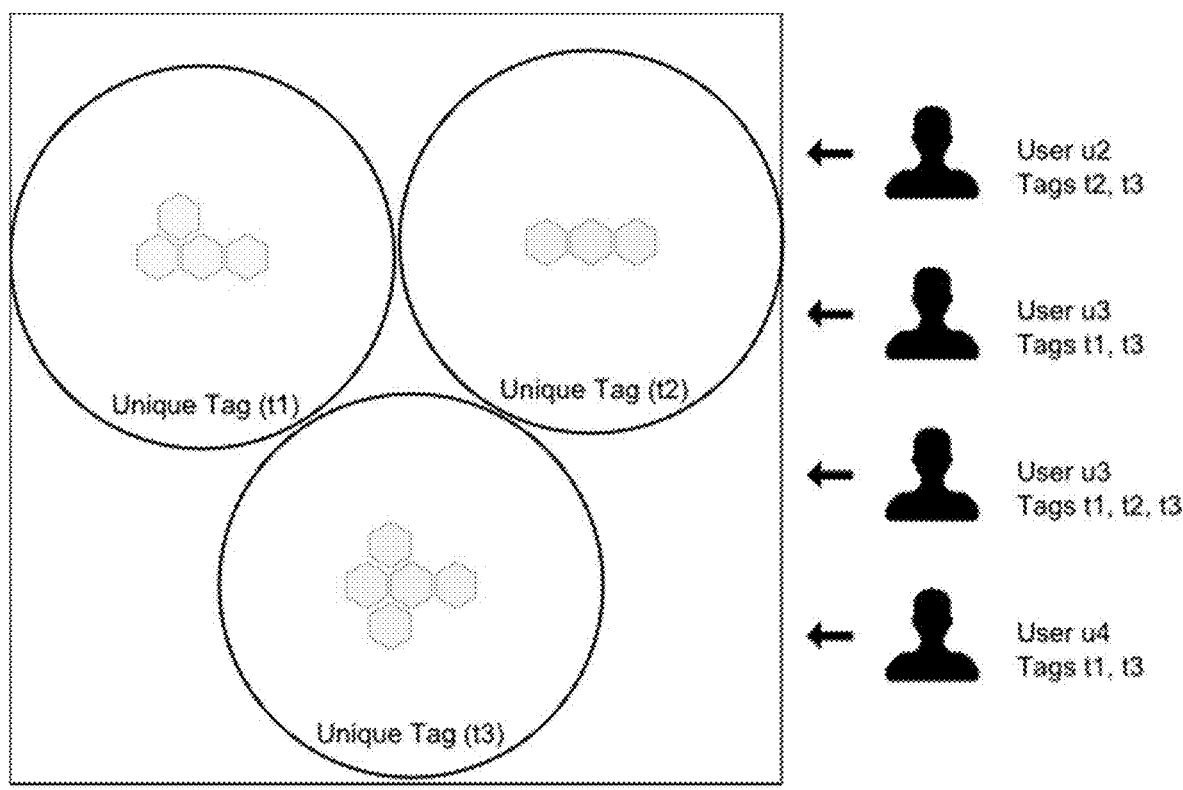
FIG. 14 illustrates an example of the canvas initialized with user interest and experiences.

The method may then initialize the binning in the canvas (1208.) Thus, for the particular user of the client on which the binning is being performed, the user tags are placed at the center of each unique tag circle. In one implementation, hexagonal shapes are used to depict these tags as shown in FIG. 13. Then, new users with different combination of tags clicks to view webcast wc. Thus, as shown in FIG. 14, each tag may have one or more hexagons representing the tags of the user and the other users of the system, such as users u2, u3, u3 and u4 in the example in FIG. 14. In the method, the newly joining audiences' tags may be placed alongside existing hexagonal bins using following heuristics— tn←tag ti of newly joining user ui
    to←oldest hexagon of similar type ti.
        IF right side of to is unoccupied AND tn doesn't intersect circumference of circle ti THEN place tn to the right side of to. (i)
        ELSE IF left side of to is unoccupied AND tn doesn't intersect circumference of circle ti THEN place tn to the left side of to. (ii)
        ELSE IF top-right side of to is unoccupied AND tn doesn't intersect circumference of circle ti THEN place tn to the top-right side of to. (iii)
        ELSE IF bottom-right side of to is unoccupied AND tn doesn't intersect circumference of circle ti THEN place tn to the bottom-right side of to. (iv)
        ELSE IF top-left side of to is unoccupied AND tn doesn't intersect circumference of circle ti THEN place tn to the top-left side of to. (v)
        ELSE IF bottom-left side of to is unoccupied AND tn doesn't intersect circumference of circle ti THEN place tn to the bottom-left side of to. (vi)
    IF placement not available for to THEN SET to←second oldest hexagon of type ti AND REPEAT steps (i) through (vi)
    IF placement not available for all to THEN start a new layer on top of existing hexagons AND REPEAT steps (i) through (vi)

Figure 15:
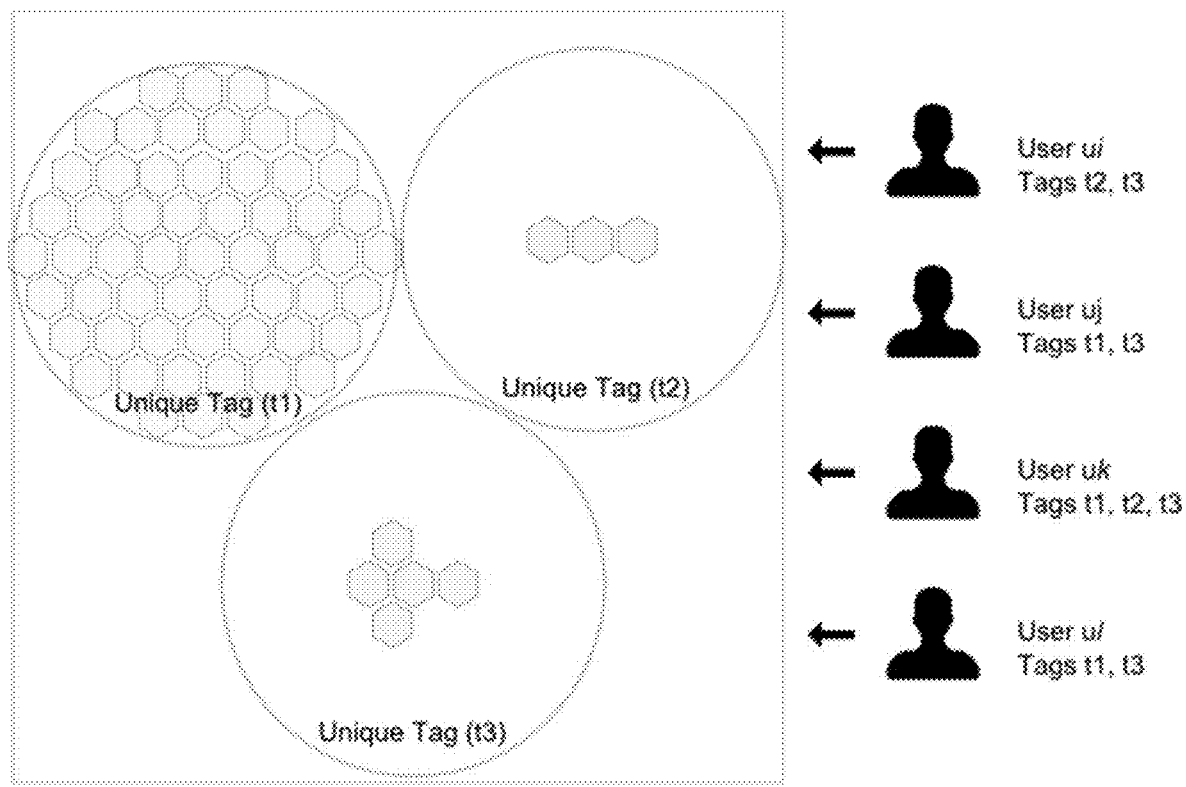
FIG. 15 illustrates an example of audience binning in which all of the available spots for a given tag are exhausted.
Figure 16:
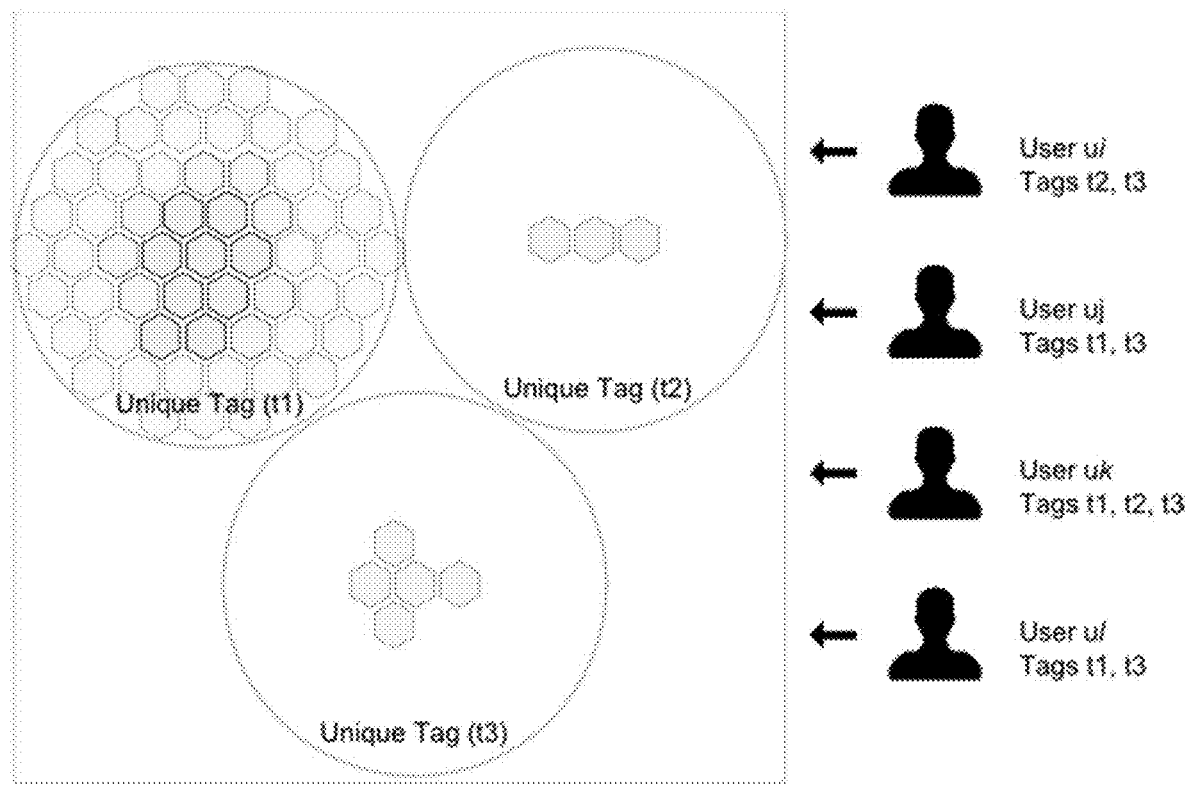
FIG. 16 illustrates an example of audience binning in which a new layer is being formed to top of a layer in the canvas.
Figure 17:
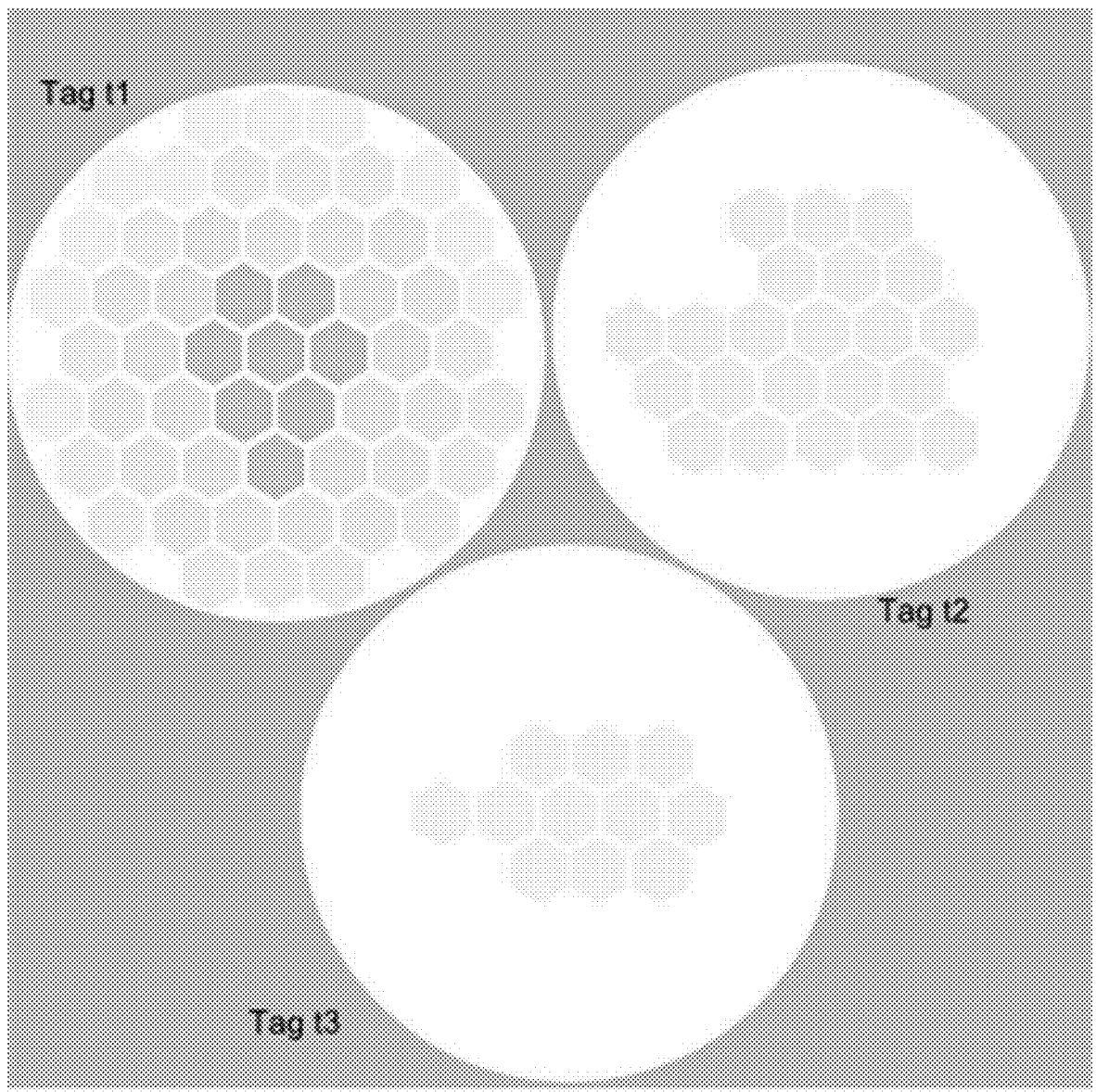
FIG. 17 illustrates an example of a user interface showing the results of the audience binning.

The method may generate one or more audience binning user interfaces (examples of which are shown in FIGS. 15-17) (1212.) For example, FIG. 15 shows a state where all the available spots for a given layer is exhausted for tags of type t1 while FIG. 16 shows a state where new layer is being formed on top of existing layer. Addition of new layers makes hexagons more dense (opaque) signifying the higher volume of audiences of type t1. FIG. 17 is a user interface that shows a state where volume of audiences with tag type t1 is higher than the previous two illustrations. Translucent hexagons when layered on top of each other make them more opaque indicating more audience members. Thus, a user of the system may take an action, such as starting a chat session using the system, with a subset of the audience members that the user may select based on the audience binning.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. An audience binning method, comprising:
receiving, at a client component, at least one of an interest and an expertise of an audience member, the client component displaying a presentation;
allowing the audience member to interact with the presentation and take an action;
communicating the action and the one or more interests and expertise to a backend system that also receives a set of interests and expertise from other audience members;
synchronizing, by the backend system to the client component, the set of interests and expertise from other audience members to the client component;
generating, at the client component, a binning for each interest and each expertise wherein each binning is generated using the interests and expertise of the audience members and a user tag is placed into one or more hexagonal bins and each binning having a plurality of audience members with one of the interest and the expertise, wherein generating the binning for a newly joining audience member comprises placing one or more tags of the newly joining audience member alongside existing hexagonal bins using a heuristic based on relationship between an oldest hexagon of a similar type to the tag of the newly joined audience member and the one or more tags of the newly joining audience member;
generating and displaying the binning of the interests and expertise of the audience members;
generating a canvas for the presentation having a height and a width and inserting each interest or expertise into the canvas using a hexagonal binning process and a circle packing process; and inserting a new audience interest or a new audience expertise into the canvas using a heuristic process.

2. The method of claim 1 further comprising generating a user interface that displays each interest and the audience members who share each interest.

3. The method of claim 1, wherein generating the user interface further comprises using a circle packing process and a hexagonal binning process.

4. The method of claim 2 further comprising performing, using the client component, an action based on the user interface.

5. The method of claim 4, wherein the action is a chat session with audience members that have a particular interest.

6. The method of claim 1, wherein the generating the binning further comprises optimizing the canvas for the presentation.

7. The method of claim 1, wherein generating the binning further comprises assigning one or more tags to each audience member based on the set of interests of the audience member, forming a tag circle for each tag and binning each audience member using the tags and the tag circle.

8. A presentation system, comprising:
a plurality of computer device having a processor, memory and a plurality of lines of instructions configured to be used by an audience member of a presentation;
a presentation system, capable of coupling to the plurality of computer devices, that generates the presentation and distributes the presentation to each computer device;
each computer device further configured to gather one or more interests and expertise from the audience member as the audience number registers for the presentation, allow the audience member to interact with the presentation and take an action, and communicate the action and the one or more interests and expertise to the presentation system;
the presentation system having a processor, memory and a plurality of lines of instructions configured to: receive a set of interests and expertise from other audience members and synchronize the set of interests and expertise from other audience members to each computer device;
each computer device further configured to generate a binning for each interest and each expertise and a user tag is placed into one or more hexagonal bins wherein each binning is generated using the interests and expertise of the audience members and having a plurality of audience members with one of the interest and the expertise and generate and display a user interface of the binning of the interests and expertise of the audience members; and
the presentation system further configured to place, for a newly joining audience member, one or more tags of the newly joining audience member alongside existing hexagonal bins using a heuristic based on relationship between an oldest hexagon of a similar type to the tag of the newly joined audience member and the one or more tags of the newly joining audience member, periodically update the binning for each interest and each expertise, generate a canvas for the presentation having a height and a width, insert each interest or expertise into the canvas using a hexagonal binning process and a circle packing process and insert a new audience interest or a new audience expertise into the canvas using a heuristic process.

9. The system of claim 8, wherein the presentation system is further configured to generate a user interface that displays each interest and the audience members who share each interest.

10. The system of claim 8, wherein the presentation system is further configured to generate the binning using a circle packing process and a hexagonal binning process.

11. The system of claim 8, wherein the presentation system is further configured to synchronize a set of interests and expertise for each client to each of the client to which the presentation is distributed.

12. The system of claim 8, wherein the presentation is one of a webcast and a virtual event.

13. The system of claim 8, wherein the action is a chat session with audience members that have a particular interest.

14. The system of claim 8, wherein the action is a chat session with audience members that have a particular expertise.

15. The presentation system of claim 8, wherein each computer device is further configured to assign one or more tags to each audience member based on the set of interests of the audience member, form a tag circle for each tag and bin each audience member using the tags and the tag circle.

16. An apparatus for audience binning, comprising:
a computing device having a processor, memory and a plurality of lines of instructions, wherein the computing device is configured to:
gather one or more interests and expertise from an audience member as the audience member registers for a presentation, allow the audience member to interact with the presentation and take an action, communicate the action and the one or more interests and expertise to a backend system that also receives a set of interests and expertise from other audience members; and
the backend system being configured to:
synchronize the set of interests and expertise from other audience members to the computing device, generate a binning for each interest and each expertise wherein each binning is generated using the interests and expertise of the audience members and a user tag is placed into one or more hexagonal bins and having a plurality of audience members with one of the interest and the expertise, place, for a newly joining audience member, one or more tags of the newly joining audience member alongside existing hexagonal bins using a heuristic based on relationship between an oldest hexagon of a similar type to the tag of the newly joined audience member and the one or more tags of the newly joining audience member and display a user interface of the binning of the interests and expertise of the audience members, generate a canvas for the presentation having a height and a width and insert each interest or expertise into the canvas using a hexagonal binning process and a circle packing process and insert a new audience interest or a new audience expertise into the canvas using a heuristic process.

17. The apparatus of claim 16, wherein the backend system is further configured to generate a user interface that displays each interest and the audience members who share each interest.

18. The apparatus of claim 16, wherein the backend system is further configured to generate the binning using a circle packing process and a hexagonal binning process.

19. The apparatus of claim 16, wherein the presentation is one of a webcast and a virtual event.

20. The apparatus of claim 16, wherein the action is a chat session with audience members that have a particular interest.

21. The apparatus of claim 16, wherein the backend system is further configured to optimize the canvas for the presentation.

22. The apparatus of claim 16, wherein the computing device is further configured to generate the binning by assigning one or more tags to each audience member based on the set of interests of the audience member, forminf a tag circle for each tage and binning each audeince member using the tags and the tag circle.

* * * * *